United States Patent
Suzuki et al.

(10) Patent No.: US 7,072,570 B2
(45) Date of Patent: Jul. 4, 2006

(54) DISK RECORDING AND/OR REPRODUCING APPARATUS AND CONTROL METHOD THEREOF

(75) Inventors: Takeshi Suzuki, Tokyo (JP); Shigeho Ogawa, Kanagawa (JP); Yoshinori Shimizu, Tokyo (JP); Hiromasa Watanabe, Tokyo (JP); Takashi Tajiri, Saitama (JP); Nobuyuki Aoki, Kanagawa (JP); Shinji Nagasaka, Chiba (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 09/910,984

(22) Filed: Jul. 23, 2001

(65) Prior Publication Data
US 2003/0227835 A1 Dec. 11, 2003

(30) Foreign Application Priority Data
Jul. 24, 2000 (JP) ............................. 2000-222759

(51) Int. Cl.
*H04N 5/91* (2006.01)
*G11B 21/08* (2006.01)

(52) U.S. Cl. .................. 386/46; 386/125; 386/126; 369/30.32; 369/30.36; 369/30.55

(58) Field of Classification Search .................. 386/46, 386/125–126; 369/30.32, 30.36, 30.55, 53.1, 369/53.12
See application file for complete search history.

(56) References Cited

U.S. PATENT DOCUMENTS

| | | | | |
|---|---|---|---|---|
| 4,196,907 A | * | 4/1980 | Takizawa et al. | 369/200 |
| 4,903,140 A | * | 2/1990 | Okamoto et al. | 369/199 |
| 5,485,436 A | * | 1/1996 | Forget et al. | 369/30.55 |
| 2003/0117932 A1 | * | 6/2003 | Morishima et al. | 369/116 |
| 2003/0227835 A1 | * | 12/2003 | Suzuki et al. | 369/30.36 |
| 2004/0146001 A1 | * | 7/2004 | Koll et al. | 369/275.1 |
| 2005/0281183 A1 | * | 12/2005 | Honda et al. | 369/53.1 |

* cited by examiner

*Primary Examiner*—Vincent Boccio
(74) *Attorney, Agent, or Firm*—Frommer Lawrence & Haug LLP; William S. Frommer

(57) ABSTRACT

Provided are: a turn table for storing a disk shaped recording medium Dn to be vertically placed; a disk drive unit disposed at the center part of the table, the disk drive unit mounting a recording medium Dn to record and/or reproduce an information signal SIN; disk carrying means for carrying the recording medium Dn between the disk drive unit and the turn table; and a control device, wherein the control device controls the turn table and disk carrying medium so as to detect whether or not the recording medium Dn is stored in the disk storage unit, judge an information recording face of the recording medium Dn removed from the disk storage unit, and based on the judgment result, mount the recording medium Dn intact on the disk drive unit or invert the recording medium Dn, thereby remounting the medium on the disk drive.

In this manner, even in the case a recording medium is mounted to be oriented in opposite, a user can automatically mount the recording medium with its information recording face toward a disk drive unit without removing the recording medium from the unit.

27 Claims, 20 Drawing Sheets

FORWARD

FIG. 9

| SLOT NUMBER | DISK MOUNTING | | |
|---|---|---|---|
| | TYPE | STATES OF SIDE-A AND SIDE B | |
| 1 | DVD | A | INFORMATION RECORDING FACE |
| | | B | INFORMATION RECORDING FACE |
| 2 | CD | A | INFORMATION RECORDING FACE |
| | | B | LABEL FACE |
| 3 | VCD | A | INFORMATION RECORDING FACE |
| | | B | LABEL FACE |
| 4 | SVCD | A | INFORMATION RECORDING FACE |
| | | B | LABEL FACE |
| 5 | SACD | A | INFORMATION RECORDING FACE |
| | | B | LABEL FACE |
| 6 | VACANT | A | UNDEFINED |
| | | B | UNDEFINED |
| ⋮ | ⋮ | ⋮ | ⋮ |
| 300 | CD | A | INFORMATION RECORDING FACE |
| | | B | LABEL FACE |

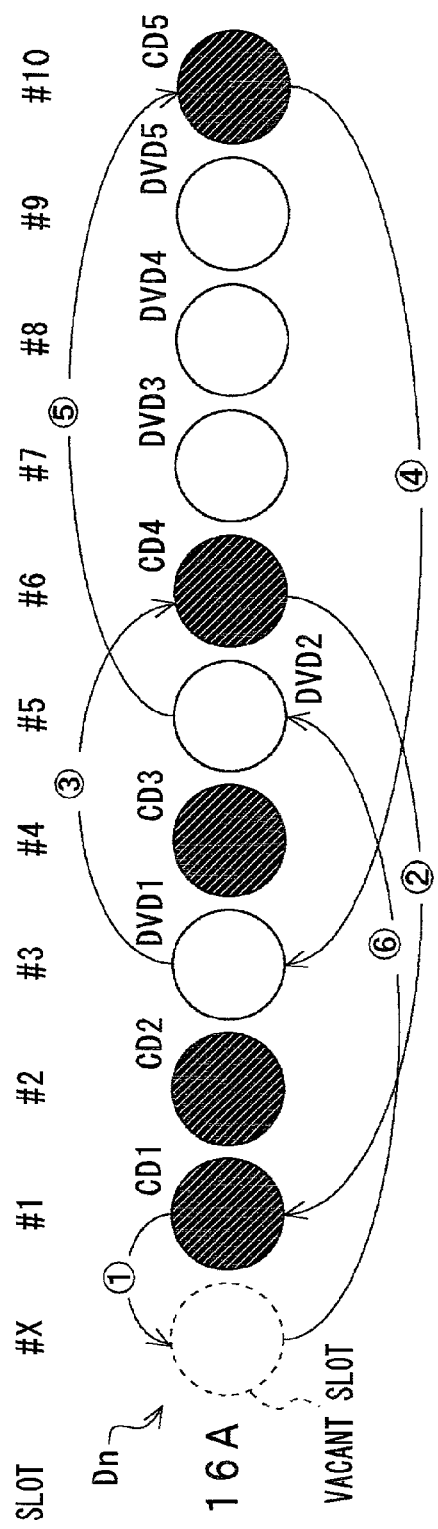
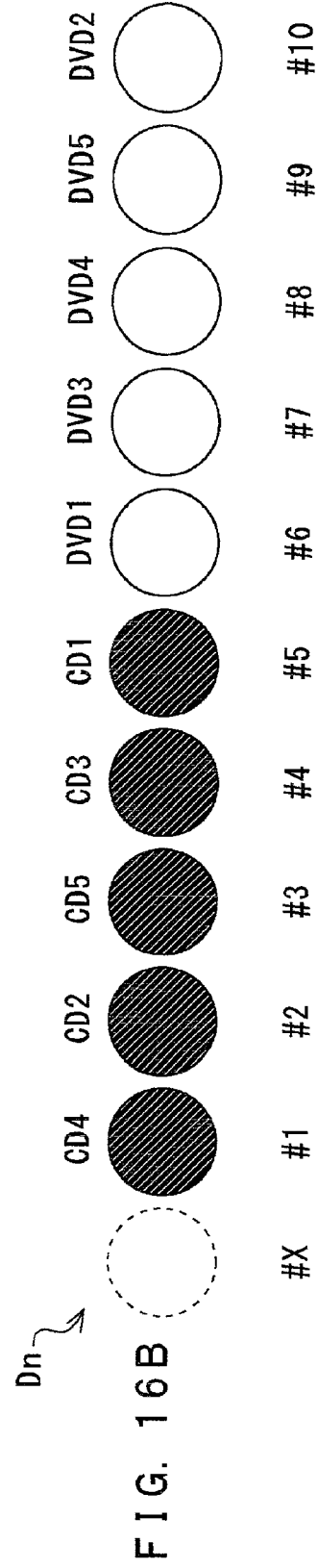
FIG. 16A
FIG. 16B

DISK RECORDING AND/OR REPRODUCING APPARATUS AND CONTROL METHOD THEREOF

BACKGROUND OF THE INVENTION

1. Field of the Invention

The present invention relates to a disk recording and/or reproducing apparatus and a control method thereof suitably applicable to a turn table for storing a disk shaped recording medium to be vertically placed, a hundred-CD changer comprising a function for controlling the disk carrying means or the like, a DVD changer, or a DVD/CD changer and the like.

2. Description of Related Art

In recent years, there has been designed a disk recording and/or reproducing apparatus capable of storing a number of optical disks such as CD (Compact Disk) or DVD (Digital Versatile Disc) and the like to be vertically placed on a turn table. FIG. 1 is a conceptual view showing an exemplary configuration of a disk reproducing apparatus 11 of such type when viewed from a side face.

The disk reproducing apparatus 11 shown in FIG. 1 is provided so as to vertically place an optical disk Dn (n=1 to 100) on a turn table 28. This disk reproducing apparatus 11 comprises a turn table 28 supported on a base chassis (not shown) to be turned. At this turn table 28, a disk storage unit 39 capable of storing an optical disk D to be vertically placed is provided at 100 sites. Such 100 disk storage units 39 are arranged in a circumferential direction with equally angled intervals, and are disposed in a radial shape.

A disk drive unit (not shown) reproducibly operating the optical disk D is arranged at the outside of this turn table 28. This disk drive unit comprises: a disk table for driving the optical disk D to be turned by chucking it; and an optical pickup unit or the like for reading out an information signal relevant to the optical disk D mounted on this disk table, the disk being integrally driven to be turned.

Disk carrying means 64 for carrying the optical disk D is provided between this turn table 28 and the disk drive unit. This disk carrying means 64 comprises: a turning arm 67 turnably supported on a base chassis; and a pair of pinch pieces 68 or the like mounted at a tip end of this turn arm 67. The turn arm 67 is capable of turning by an angle of substantial 90 degrees in a vertical direction, and a pair of pinch pieces 68 are mounted at its tip portion so that they can pinch the optical disk D in a thickness direction.

In FIG. 1, the turn arm 67 is initiated by being turning forwardly and upwardly as indicated by the solid line, whereby a pair of pinch pieces 68 move to the optical disk D side, and part of the optical disk D is inserted between both of the pinch pieces 68. This makes it possible to pinch the optical disk D by a pair of pinch pieces 68. Next, the turn arm 67 is turned backwardly and downwardly, whereby the optical disk D pinched by a pair of pinch pieces 68 is removed from the disk storage unit 39, and is carried to a disk mount unit 65 of a disk drive unit (not shown). At this disk mount unit 65, the optical disk D is chucked by a disk table of the disk drive unit and a chucking plate. Then, the turn arm 67 is further turned backwardly in predetermined quantity in order to avoid contact with the optical disk D, and is retracted to a position indicated by the dashed line.

That is, when the optical disk D is removed from the disk storage unit 39 or when the optical disk D is stored in the disk storage unit 39, the optical disk D is significantly lifted upwardly by means of a turning movement of the turn arm 67. In addition, at a reproduction position at which the optical disk D is mounted on the disk mount unit 65, the turn arm 67 is significantly moved downwardly in order to prevent a pair of pinch pieces 68 from interfering with the optical disk D. Therefore, a height H from the bottom end of the disk carrying means 64 to the top end of the optical disk D is increased, and the entire apparatus has been unavoidably increased in height.

In the meantime, according to the previously described disk reproducing apparatus 11, there is an attempt to determine a mount position of a disk drive unit so as to lower the height H of the entire apparatus. For example, there is provided a mechanism of mounting the disk drive unit inside of a turn table 28, and mounting the optical disk D inside of the turn table 28, thereby causing a reproducing operation.

However, in such mechanism of mounting the disk drive unit inside of the turn table 28, when the optical disk D is mounted on the disk drive unit, it is required to arrange a disk face in line so as to orient the information recording face to the disk drive unit. Therefore, in the case where the optical disk D is mounted so that a disk face that is not on an information recording face side is opposed to the disk drive unit, there occurs a problem that a user must remove the optical disk D from the unit 11, and remount the information recording face toward the disk drive unit.

As means for solving such problem with incorrect mounting of the optical disk D (hereinafter, referred to as a "recording medium"), there is provided a mechanism of mounting a base unit with a pair two disk drive units inside of the turn table 28. However, this mechanism leads to an increased number of parts and higher cost of the apparatus, which prevents general-purpose use of the disk reproducing apparatus 11 or a disk recording apparatus to which this mechanism is applied.

SUMMARY OF THE INVENTION

The present invention has been made in order to solve the foregoing problem. It is an object of the present invention to provide a disk recording and/or reproducing apparatus and a control method of the apparatus, capable of, even in the case a recording medium is mounted to be oriented opposite to a disk drive unit, automatically mounting the information recording face toward the disk drive unit without the user removing the recording medium from the unit.

According to a first aspect of the present invention, there is provided a disk recording and/or reproducing apparatus comprising:

a turn table on which a disk storage unit for storing a disk shaped recording medium to be vertically placed is arranged in plurality in a circumferential direction;

a disk drive unit disposed in a center hole provided at the center of the turn table, the disk drive unit mounting the recording medium to record and/or reproduce an information signal;

disk carrying means for carrying the recording medium between the disk drive unit and the turn table; and control device for controlling the input and output of the turn table, the disk drive unit, and the disk carrying means, wherein the control device judges whether or not the recording medium is stored in the disk storage unit, and judges an information recording face of the recording medium removed from the disk storage unit, the control device controlling the turn table and the disk carrying means so as to mount the recording medium intact on the disk drive unit based on the judgment result or invert the recording medium, thereby remounting the medium on the disk drive unit.

A disk recording and/or reproducing apparatus according to the present invention stores a disk shaped recording medium of single sided recording system, for example, to be vertically placed on a turn table on which a plurality of disk storage units are arranged in a circumferential direction. When a position of the disk storage unit is specified for a control device so as to select an arbitrary recording medium, the control device detects whether or not a recording medium is stored in a specified disk storage unit. In the case where the recording medium is stored in the specified disk storage unit, the recording medium is carried by the disk carrying means from one side of the turn table to a disk drive unit.

Then, the recording medium removed from the disk storage unit is mounted on the disk drive unit, an information signal recorded at a predetermined position of the recording medium is detected, and it is judged whether or not the disk face is an information recording face based on the detection result. In the case where the disk face is an information recording face based on the judgment result, an information signal is reproduced while the recording medium is mounted intact on the disk drive unit.

In the case where the disk face is not an information recording face, the recording medium is carried out by disk carrying means from the disk drive unit to its source side of the turn table. Then, the turn table having the recording medium stored therein is inverted, and the recording medium is carried by the disk carrying means from the other side of the turn table to the disk drive unit. In this manner, the recording medium is remounted to be oriented opposite to the disk drive unit. The inverted recording medium is then reproduced.

Therefore, even in the case where an information recording face of a disk shaped recording medium of single sided recording system is mounted to be oriented opposite to the disk drive unit, the user inverts the turn table having the recording medium stored therein without removing the recording medium from the unit, whereby the information recording face can be mounted toward the disk drive unit.

Moreover, even in the case where a plurality of recording media are not stored with their information recording faces being arranged in a predetermined orientation in the disk storage unit, the turn table is inverted while the disk drive unit mounts the recording media, whereby the information recording faces of these recording media can be arranged in the predetermined orientation. The user can mount a recording medium randomly on a disk storage unit without worrying about which of the disk faces is an information recording medium.

According to a second aspect of the present invention, there is provided a method of controlling a disk recording and/or reproducing apparatus that comprises: at least a turn table on which a disk storage unit for storing a disk shaped recording medium to be vertically placed is arranged in plurality in a circumferential direction; a disk drive unit disposed in a center hole provided at the center of the turn table, the disk drive unit mounting the recording medium to record and/or reproduce an information signal; and disk carrying means for carrying the recording medium between the disk drive unit and the turn table, the control method comprising the steps of:

detecting whether or not a recording medium is stored in the disk storage unit;

mounting the recording medium from the disk storage unit at which the presence of storage has been detected, and judging an information recording face of the recording medium;

controlling the turn table and disk carrying means so as to mount the recording medium intact on the disk drive unit based on the judgment result or invert the recording medium to remount the medium on the disk drive unit.

In a method of controlling a disk recording and/or reproducing apparatus according to the present invention, even in the case where a recording medium is mounted to be oriented opposite to a disk drive unit, a user can mount the information recording face toward the disk drive unit without removing the recording medium from the unit. Moreover, even in the case where a plurality of recording media are mounted on the disk storage units with their information recording faces being oriented at random, the information recording faces of these recording media can be arranged in a predetermined orientation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principle of the present invention.

FIG. 9 is an imaginary view showing a recording example in a memory 44;

FIG. 16A and FIG. 16B are imaginary views each showing an example of mounting an optical disk Dn and an example of these arrangements during disk rearrangement.

DETAILED DESCRIPTION OF THE INVENTION

Figure 1:
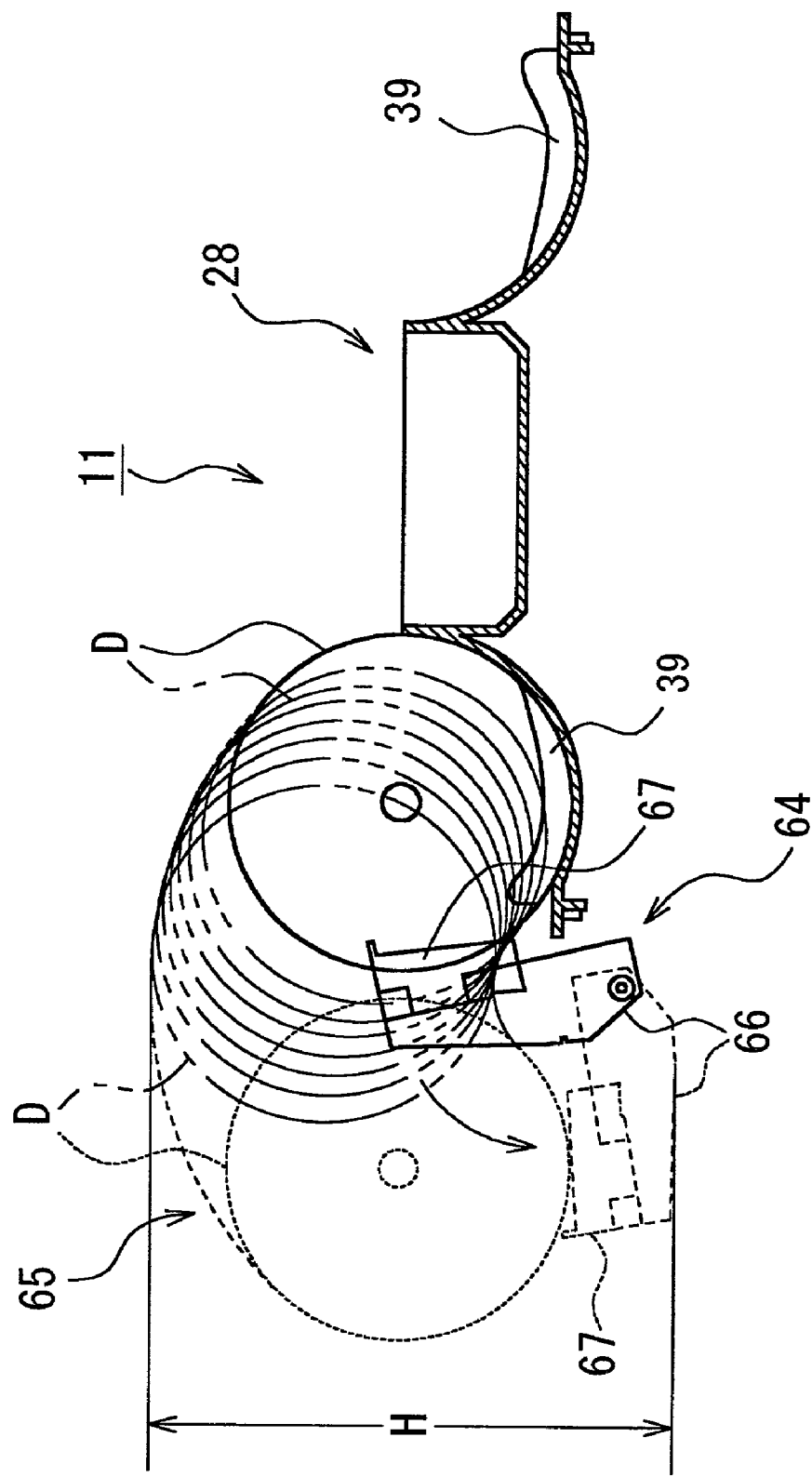
FIG. 1 is a conceptual view showing an exemplary configuration when a disk reproducing apparatus 11 according to a conventional example is viewed from a side face.

Reference will now be made in detail to the presently preferred embodiments of the invention as illustrated in the accompanying drawings, in which like reference numerals designate like or corresponding parts.

Hereinafter, one embodiment of a disk recording and/or reproducing apparatus and control method of the apparatus according to the present invention will be described with reference to the accompanying drawings.

(1) Preferred Embodiments

Figure 2:
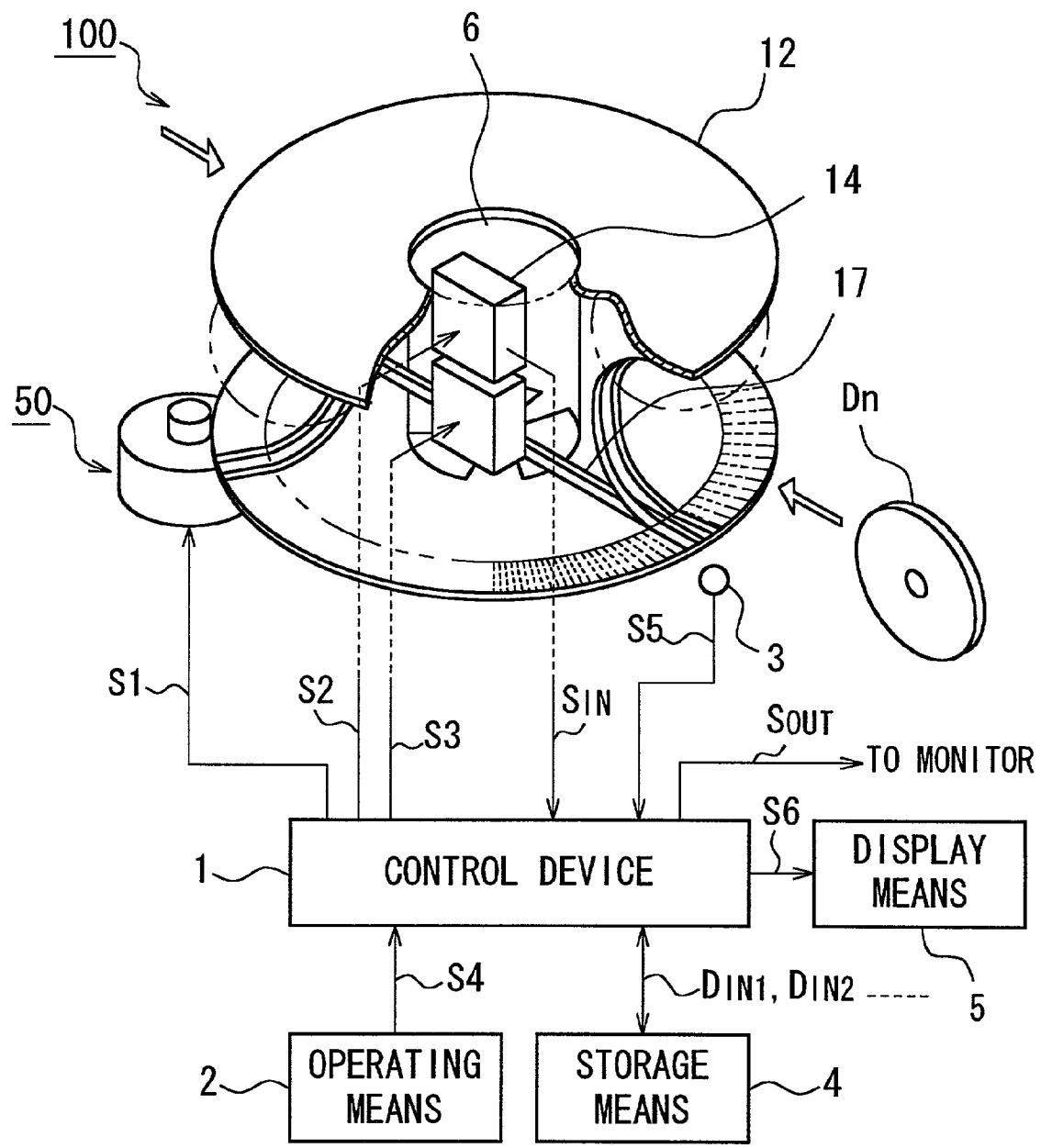
FIG. 2 is a block diagram showing an exemplary configuration of a disk recording and/or reproducing apparatus 100 embodied according to the present invention.

FIG. 2 is a block diagram depicting an exemplary configuration of a disk recording and/or reproducing apparatus 100 embodied according to the present invention.

In the present embodiment, there are provided a turn table for storing a disk shaped recording medium to be vertically placed and a control device for controlling disk carrying means for the medium or the like, wherein it is detected whether or not the recording medium is stored in the turn table, an information recording face of the recording medium removed from the disk storage unit is judged, and the recording medium is mount intact on a disk drive unit or the recording medium is inverted so as to be remounted on the disk drive unit based on the judgment result.

Even in the case the recording medium is mounted to be oriented opposite to the disk drive unit, the user can automatically mount the information recording face toward the disk drive unit without removing the recording medium from the unit. In addition, even in the case where a plurality of recording media are mounted on a disk storage unit with their information recording faces being oriented at random, the information recording faces of these recording media can be arranged in a predetermined orientation.

A disk recording and/or reproducing apparatus 100 shown in FIG. 2 has a doughnut shaped turn table 12. A plurality of disk storage units (slots) 20 are arranged in the circumferential direction of this turn table 12, and a disk shaped recording medium Dn (for example, n=1 to 100, 200, 300) is stored (mounted) to be vertically placed in each of the disk storage units 20. 100 to 300 recording media Dn are stored in the disk storage units 20. The turn table 12 is provided so as to be turned clockwise and counterclockwise in each slot by means of a table turn driving mechanism 50. The table turn driving mechanism 50 is provided so as to control the turn table 12 based on a turn control signal S1.

A hole portion (hereinafter, referred to as a center hole portion) 6 is provided at the center of this turn table 12, and a disk drive unit 14 is disposed inside of this center hole portion 6. In addition, the recording medium Dn is mounted so as to record and/or reproduce an information signal SIN based on a write/readout control signal S2.

Disk carrying means 17 is disposed between this disk drive unit 14 and the turn table 12 to carry the recording medium Dn to be mounted from disk storage unit 20 of one side of the turn table 12 into the disk drive unit 14 based on a carrying control signal S3 or to eject the recording medium Dn from the disk drive unit 14 to the other disk storage unit 20. In addition, the recording medium Dn mounted from disk storage unit 20 of one side of the turn table 12 into the disk drive unit 14 may be carried so as to be ejected to the source disk storage unit 20. The disk drive unit 14 and disk carrying means 17 are arranged to be separated from the turn table 12, and are mounted on a main frame (not shown) or the like.

A control device 1 is provided at this disk recording and/or reproducing apparatus 100 so as to output a write readout control signal S2 to the disk drive unit 14, output an information signal SIN to an external monitor after converted into a reproduction output signal SOUT, or control input/output of the turn table 12, the disk drive unit 14, and the disk carrying means 17.

The control device 1 is provided so as to output a turn control signal S1 for controlling the turn table 12 to the table turn driving mechanism 50 based on a storage enable or disable detection signal S5 or output a carrying control signal S2 for controlling disk carrying means 17. A central processing unit (CPU) or a microprocessor unit (MPU) is used for the control device 1. The control device 1 detects whether or not the recording medium Dn is stored in the disk storage unit 20, and judges the information recording face of the recording medium Dn removed from this disk storage unit 20. Based on the judgment result, the turn table 12 and disk carrying means 17 are controlled so as to mount the recording medium Dn on the disk drive unit 14 intact or invert the recording medium Dn to be remounted on the disk drive unit 14.

Operating means 2 is connected to this control device 1. When an arbitrary recording medium Dn is selected or is instructed to be inverted, operation is made so as to specify the position of the disk storage unit 20 for the control device 1 or instruct the medium to be inverted. By operating this operating means 2, a disk operating signal S4 indicative of selection of the recording medium Dn or instruction for inversion is output to the control device 1. Detecting means 3 as well as the operation means 2 is connected to the control device 1, and is provided so as to detect whether or not the recording medium Dn is stored in the disk storage unit 20 specified by this operating means 2 and output a storage enable/disable detection signal S5 to the control device 1.

In this control device 1, disk shaped recording media Dn of single sided recording system and double sided recording system are handled based on the disk operating signal S4 or storage enable/disable detection signal S5. The recording medium Dn of single sided recording system is a CD family such as CD (Compact Disc), VCD (Video Compact Disc), SVCD (Still Video Compact Disk), or SACD (Super Audio Compact Disc). The recording medium Dn of double sided recording system is an optical disk such as DVD (Digital Versatile Disc).

In this example, in the case of handling the recording medium Dn of single sided recording system, the control device 1 mounts the recording medium Dn removed from the disk storage unit 20 on the disk drive unit 14, detects an information signal SIN recorded at a predetermined position of the recording medium Dn, and judges whether or not the disk face is an information recording face based on detection of the information signal SIN. This is because the information recording face must be oriented to the disk drive unit side.

In this example, in the case where the information recording face of the recording medium Dn of single sided recording system is mounted to be oriented opposite to the disk drive unit 14, the control device 1 is provided so as to eject the recording medium Dn to the turn table 12, invert this turn table 12, and then, mount the information recording face of the recording medium Dn toward the disk drive unit 14.

In addition, in the case of handling a disk shaped recording medium Dn of double sided recording system, the control device 1 is provided so as to mount the recording medium Dn removed from the disk storage unit 20 on the disk drive unit 14, detect an information signal SIN recorded at a predetermined position of the recording medium Dn, judge whether or not the disk face is an information recording face based on detection of the information signal SIN, and judge whether both disk faces are information recording faces, or only a single disk face is an information recording face, or both disk faces are non-information recording faces. This is because information may be recorded on only a single face or may not be recorded in a recording medium such as DVD.

Further, in the case where reproduction sequence information is registered in advance with respect to a recording medium Dn of double sided recording system, the control device 1 is provided so as to mount the recording medium Dn removed from the disk storage unit 20 on the disk drive unit 14, detect reproduction sequence information from an information signal SIN recorded at a predetermined position of the recording medium Dn, and judge whether the disk face is an information recording face of a first reproduction sequence or an information recording face of a second reproduction sequence based on detection of the reproduction sequence information. This is because, in the case where video image information having its continuity is recorded on both disk faces, information of the first reproduction sequence is reproduced, and then, information of the second reproduction sequence is sequentially reproduced.

In the case where the first information recording face of the recording medium Dn of double sided recording system is mounted to be oriented opposite to the disk drive unit 14, the control device 1 is provided so as to eject the recording medium Dn on the turn table 12, invert the turn table 12, and then, mount the first information recording face of the recording medium Dn toward the disk drive unit 14. This is because an information signal SIN must be reproduced in correct reproduction sequence.

Further, a nonvolatile storage unit 4 is connected to the control device 1 and, for example, in the case where operating means 2 instructs the recording medium Dn to be selected or inverted, the storage unit 4 is provided to store storage position information DIN1 indicative of a storage position of the recording medium Dn on the turn table 12 and judgment result information DIN2 of the information recording face of the recording medium Dn or the like. A flash memory such as EEPROM is used for the storage unit 4. The control device 1 is provided so as to judge necessity of inverting the recording medium Dn based on the storage position information DIN1 and judgment result information DIN2 read out from the storage unit 4. This is because a response time during reproduction must be accelerated.

In addition, the control device 1 is provided so as to rewrite storage position information DIN1 every time the storage position of the recording medium Dn changes. This is because the recording media Dn is intended to be mounted precisely during next reproduction even if the storage position changes because of rearrangement of the recording media Dn or the like. Display means 5 is connected to the control device 1 so as to display a video image concerning an inverting operation of the recording medium Dn in progress based on a display control signal S6 in order to eliminate the user's uneasiness. The display control signal S6 is a signal for controlling display means 5, and is supplied from the control device 1 based on the disk operating signal S4 or storage enable/disable detection signal S5.

A liquid crystal display or an external monitor and the like is used for display means 5. Here, in the case where a recording medium Dn such as CD family is mounted on the disk drive unit 14, and the information recording face is oriented to the disk drive unit 14, a video image concerning a case in which there is no necessity of such inversion may be displayed on display means 5.

Figure 3A:
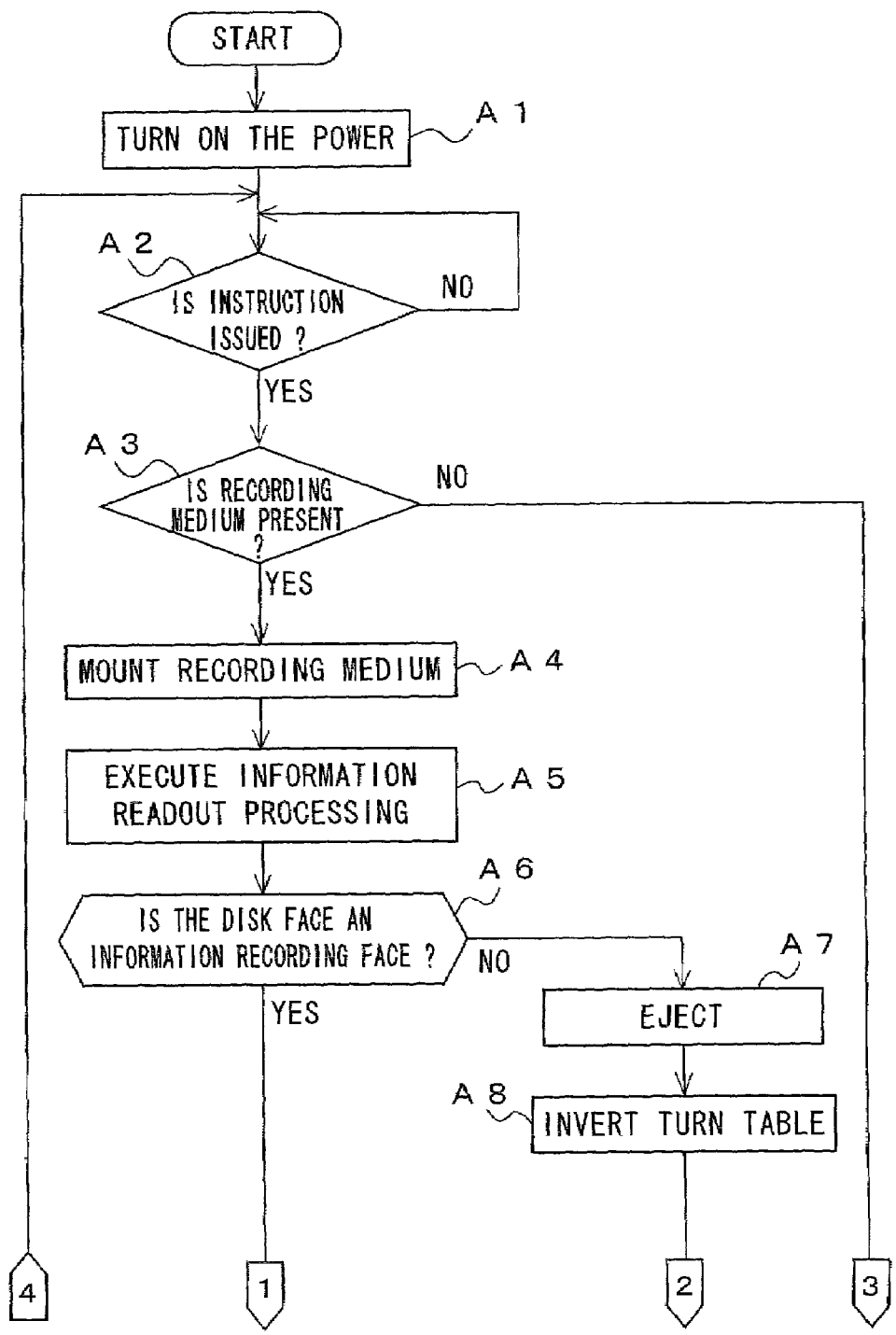
FIG. 3A and FIG. 3B are flow charts each showing a control example of the disk recording and/or reproducing apparatus 100.
Figure 3B:
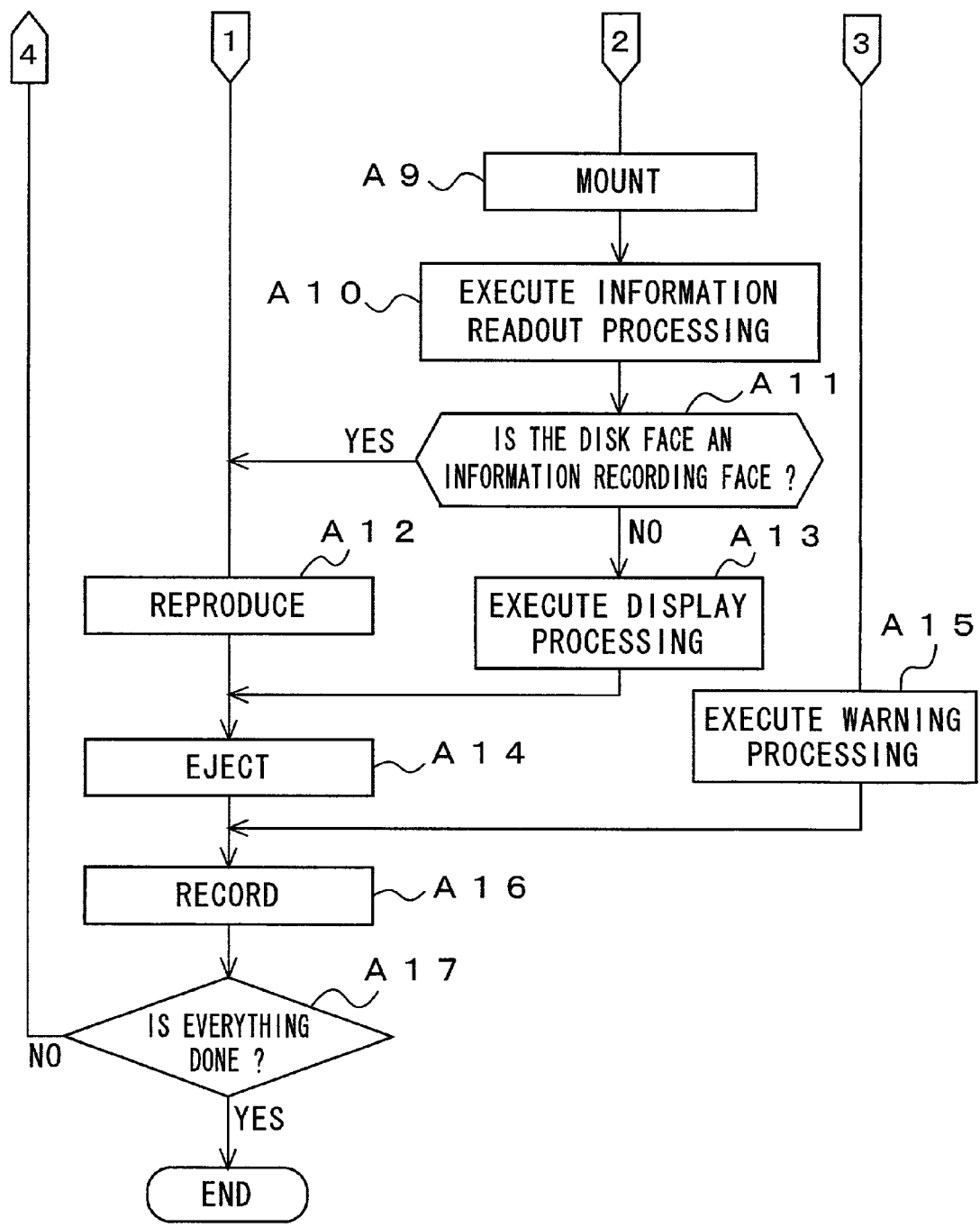

Now, a control method of a disk recording and/or reproducing apparatus 100 will be described here. FIG. 3A and FIG. 3B are flow charts each showing a control example of the disk recording and/or reproducing apparatus 100.

In the present embodiment, a disk shaped recording medium Dn of single sided recording system, for example, is stored to be vertically placed on a turn table 12 on which a plurality of disk storage units 20 are arranged in a circumferential direction. A center hole portion 6 is provided at the center of this turn table 12. A disk drive unit 14 is disposed inside of this center hole portion 6, and is provided so as to record and/or reproduce an information signal SIN by mounting the recording medium Dn. Disk carrying means 17 is disposed between the disk drive unit 14 and the turn table 12. It is presumed that the recording medium Dn is carried so as to be mounted from disk storage unit 20 of one side of the turn table 12 into the disk drive unit 14 or is carried so as to eject the recording medium Dn from the disk drive unit 14 to the other side disk storage unit 20.

With this being presumed, at the step A1 of the flow chart shown in FIG. 3A, the user turns ON the power sources of the disk recording and/or reproducing apparatus 100, and then, at the step A2, the position of the disk storage unit 20 is arbitrarily specified for the control device 1 so as to select an arbitrary recording medium Dn. During selection of the recording medium Dn, the user operates the operating means 2 to output a disk operating signal S4 to the control device 1, whereby the position of the disk storage unit 20 is specified.

In the control device 1 receiving this specification, at the step A3, detecting means 3 detects whether or not the recording medium Dn is stored in the disk storage unit 20 associated with the specification. Here, with respect to the disk storage unit 20 specified by the operating means 2, it is detected whether or not the recording medium Dn is stored, and the storage enable/disable detection signal S5 is output to the control device 1. In the case where the recording medium Dn is present in the disk storage unit 20, for example, a storage enable/disable detection signal S5 at a level H is output. In the case where the medium is absent from the disk storage unit 20, a storage enable/disable detection signal S5 at a level L is output.

Therefore, in the case where the recording medium Dn is stored in the specified disk storage unit 20, processing goes to the step A4 at which the control device 1 outputs a carrying control signal S3 to disk carrying means 17, and carries the recording medium Dn to be mounted from disk storage unit 20 of one side of the turn table 12 into the disk drive unit 14 based on the carrying control signal S3. Then, the recording medium Dn removed from the disk storage unit 20 is mounted on the disk drive unit 14, and the information signal SIN recorded at a predetermined position of the recording medium Dn is detected at the step A5.

Then, it is judged whether or not the disk face is an information recording face at the step A6 based on the detection result. In the case where the disk face is an information recording face based on the judgment result, processing goes to the step A12 of the flow chart shown in FIG. 3B at which an information signal SIN that is the information recording content is reproduced while the recording medium Dn is mounted intact on the disk drive unit 14.

In the case where the disk face is not an information recording face, processing goes to the step A7 at which the recording medium Dn is carried so as to be ejected by disk carrying means 17 from the disk drive unit 14 to the disk storage unit 20 of the source side of the turn table 12. Then, the turn table 12 having the recording medium Dn stored therein is inverted at the step A8. At the step A9 shown in FIG. 3B, the recording medium Dn is carried by the disk carrying means 17 from the other disk storage unit 20 of another side of the turn table 12 to the disk drive unit 14. In this manner, the recording medium Dn can be remounted to be oriented opposite to the disk drive unit 14.

Then, the recording medium Dn removed from the disk storage unit 20 is mounted on the disk drive unit 14, and, at the step A10, an information signal SIN recorded at a predetermined position of the recording medium Dn is detected. Then, at the step A11, it is judged whether or not the disk face is an information recording face based on the detection result. In the case where the disk face is an information recording face based on the judgment result, processing goes to the step A12 at which an information signal SIN is reproduced while the recording medium Dn is mounted intact on the disk drive unit 14. After the recording medium Dn associated with such inversion has been reproduced, processing goes to the step A16.

In the case where the disk face is not an information recording face at the step A11, processing goes to the step A13 at which display processing for displaying that neither disk faces is an information recording face is effected. This is because an unrecorded optical disk or the like in which no information is recorded may be mounted. In addition, in the case where a recording medium Dn is not stored in the disk storage unit 20 specified at the step A3 of the flow chart shown in FIG. 3A, processing goes to the step A15 shown in FIG. 3B at which alert processing for alerting that no recording medium Dn is present in a slot of the specified address is executed. During alert processing, a display control signal S6 is output to display means 5, and "No recording medium Dn is present in a slot of the specified address" is displayed. An LED or the like may be blinked as display means 5 in order to prompt the user to supply an instruction again.

Then, processing goes to the step A16 at which storage position information DIN1 and judgment result information DIN2 or the like are recorded in the storage unit 4 as management information concerning the information recording face of each recording medium Dn. This is because a response speed is accelerated during next information reproduction or the like. Then, processing goes to the step A17 at which it is judged whether control of the disk recording and/or reproducing apparatus 100 has been completed. In the case where the control thereof is not completed yet, processing reverts to the step A2 shown in FIG. 3A at which the above described processing is repeated. In addition, at the step A17, power OFF information or the like is detected, and control is terminated.

In this way, the disk recording and/or reproducing apparatus 100 embodied according to the present embodiment is provided so as to control the turn table 12 and disk carrying means 17 to detect whether or not the recording medium Dn is stored in the disk storage unit 20, mount the recording medium Dn from the disk storage unit 20 at which the storage enable has been detected, judge an information recording face of the recording medium Dn, mount the recording medium Dn intact on the disk drive unit 14 or invert the recording medium Dn so as to be remounted on the disk drive unit 14 based on the judgment result.

Therefore, even in the case where an information recording face of a disk shaped recording medium Dn of single sided recording system is mounted to be oriented opposite to the disk drive unit 14, the user inverts the turn table 12 having the recording medium Dn stored therein without removing the recording medium Dn from the unit, whereby the information recording face can be mounted toward the disk drive unit 14.

Moreover, even in the case where a plurality of recording media Dn are not stored in the disk storage unit 20 with their information recording faces being arranged in a predetermined orientation, the user inverts the turn table 12 without the disk drive unit 14 being mounted on the recording medium Dn, whereby the information recording faces of these recording media Dn can be arranged in a predetermined orientation. The user can mount the recording medium Dn at random on the disk storage unit 20 without worrying about which of the disk faces is an information recording face.

In this manner, there can be provided a disk recording and/or reproducing apparatus 100 in which one disk drive unit 14 is equipped inside of the center hole portion 6 at the center of the turn table 12.

(2) Embodiment

Figure 4:
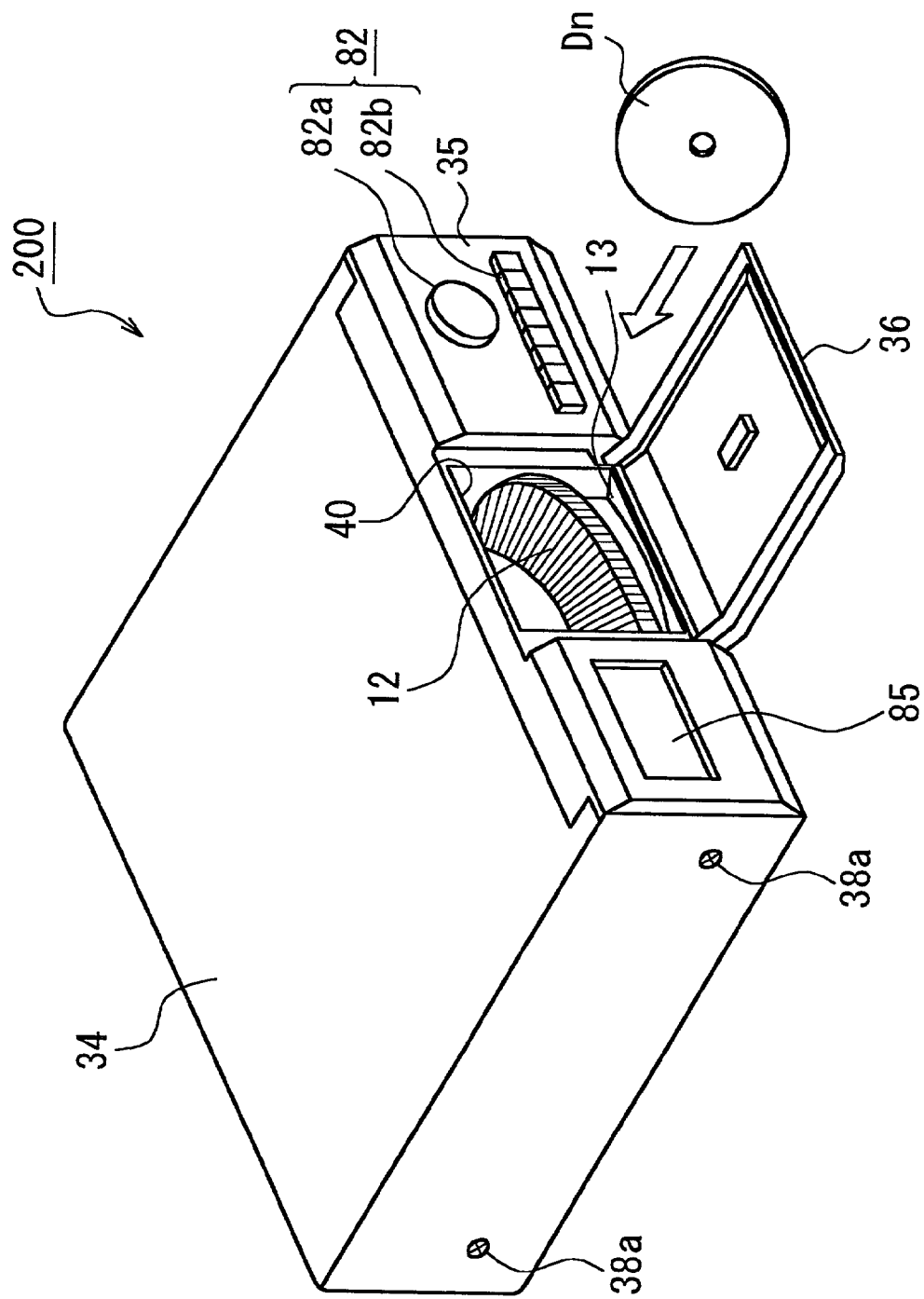
FIG. 4 is a perspective view showing an exemplary configuration of a DVD/CD changer 200 embodied according to the present invention.
Figure 5:
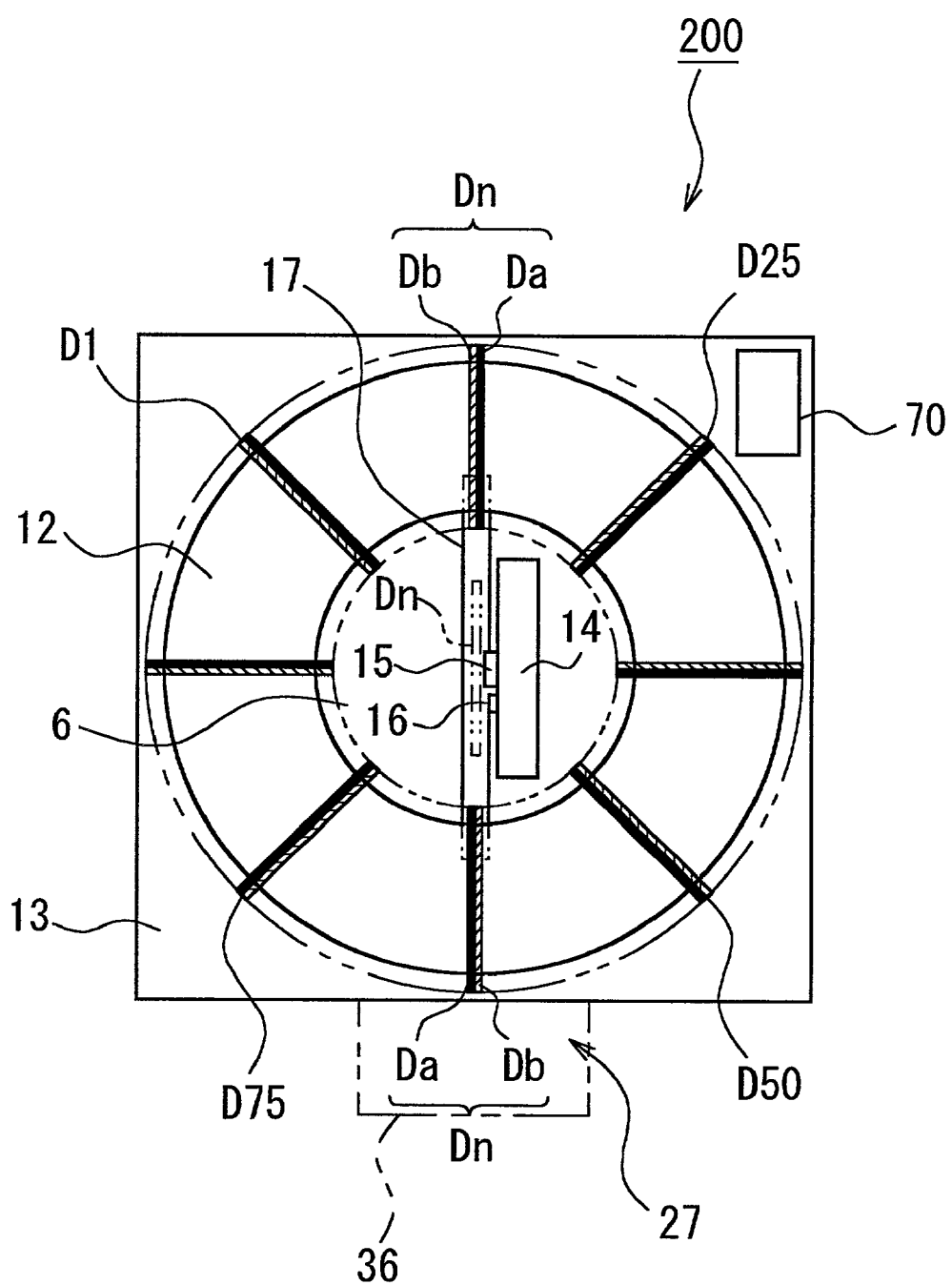
FIG. 5 is a view showing an exemplary basic configuration of the DVD/CD changer 200 viewed from an internal top face.

FIG. 4 is a perspective view showing an exemplary configuration of a DVD/CD changer 200 embodied according to the present invention. FIG. 5 is a view showing an exemplary configuration when the changer is viewed from the internal top face.

The DVD/CD changer 200 shown in FIG. 4 is provided as an example (n=300) of the disk recording and/or reproducing apparatus 100, wherein DVD (DVD-Video, DVD-Audio) or CD family (CD/VCD/SVCD/SACD) and the like is reproduced by being automatically mounted.

This DVD/CD changer 200 comprises: a turn table 12 as shown in FIG. 4, the table being placed on a main chassis 13; a sheath cover 34 provided so as to cover the main chassis 13; a front panel 35 provided at the front face of this sheath cover 34; an opening/closing door 36 provided at the center of this front panel 35; and a table support body 37 or the like (not shown).

The main chassis 13 is made of a metal plate based frame body opened on a top face and a front face, and the sheath cover 34 is engaged with the upper part of this main chassis 13. The main chassis 13 and sheath cover 34 are removably tightened with fixing screws 38a at a plurality of portions, whereby a main frame opened on a front face is configured. A front panel 35 is mounted on the front opening of this main frame, whereby a main frame of which all of six faces, i.e., a front face, a rear face, a left face, a right face, a top face, and a bottom face, are enclosed, is configured.

Figure 7:
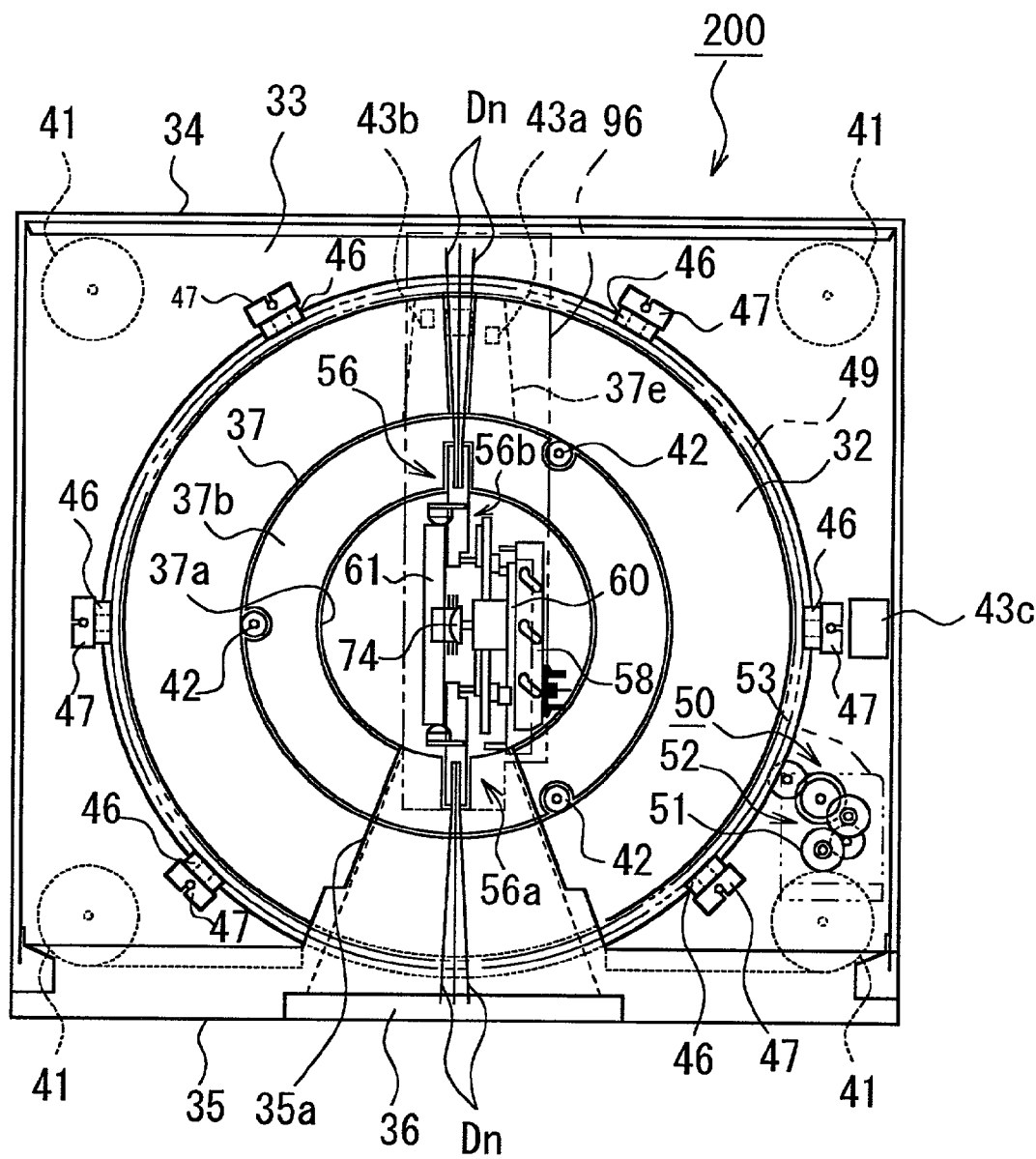
FIG. 7 is a top face view showing a specific example of the DVD/CD changer 200 viewed from an internal top face.

A disk insert/eject port 40 for inserting/ejecting an optical disk Dn is provided at the substantial center in the longitudinal direction of the front panel 35. This disk insert/eject port 40 is formed in a substantially rectangular shape, and is made openable by an opening/closing door 36. This opening/closing door 36 is turnably supported on a front panel 35 at its lower end by hinge means. The opening/closing door 36 is turned around this hinge means, and a state in which the disk insert/eject port 40 shown in FIG. 7 is closed and a state in which the disk insert/eject port 40 shown in FIG. 4 is opened can be selected.

A jog dial 82a or an operating button 82b configuring an operating unit 82, other switches and the like, or a liquid crystal display 85 and the like provided as an example of display means are mounted on the front panel 35. These operating unit 82 and liquid crystal display 85 or the like are connected to a control unit 70 on the main chassis 13. This control unit 70 will be described by way of showing FIG. 8.

The DVD/CD changer 200 shown in FIG. 5, as an exemplary basic configuration of which is shown, is provided so as to reproduce (read) an information signal SIN recorded in information recording faces Da and Db provided on both faces of the optical disk Dn by employing an optical disk for example, DVD (digital video disk) or the like Dn that shows an example of a disk shaped recording medium. This DVD/CD changer 200 comprises: a disk stack turn table 12 capable of storing so as to vertically place 300 optical disks Dn one time; and a main chassis 13 for turnably supporting this turn table 12.

This turn table 12 is formed in a planar doughnut shape, and is formed as a dram shape in a three-dimensional shape. For example, there is provided 300 disk storage units 20 capable of storing an optical disk Dn to be vertically placed in its circumferential direction. Therefore, in the case where an optical disk Dn is stored in each disk storage unit 20, these optical disks Dn are disposed in a radial manner while the turning center of the turn table 12 is defined as a reference. Such turn table 12 is supported turnably in a planar direction at the substantial center of a main chassis 13 formed of a rectangle.

A disk drive unit 14 for executing a reproducing operation for an optical disk Dn is disposed in a center hole portion (hereinafter, referred to as a base unit) 6 provided at the center of the turn table 12. This disk drive unit 14 comprises a disk table 15 to be turnably driven by chucking the optical disk Dn; and an optical pickup unit 16 for reading out an information signal SIN relevant to the optical disk Dn rotatably driven integrally by being mounted on this disk table 15. A disk table 15 of this disk drive unit 14 is mounted integrally on a rotary shaft of a spindle motor (not shown) fixed to one end in the longitudinal direction of a base chassis 21 formed of a frame body.

An opening/closing door 36 is provided on the front face of a DVD/CD changer 200 shown in FIG. 5, and is disposed at the substantial center of a front panel shown in FIG. 4. Its lower end is turnably supported on the front panel by hinge means. A space portion to be opened and closed by this opening/closing door 36 is defined as a disk eject/mount port 27 for ejecting/mounting an optical disk Dn. In response to the opening/closing door 36 for opening/closing this disk eject/mount port 27, the disk drive unit 14 and disk carrying means 17 are disposed to extend in the forward and backward direction so as to form a right angle, respectively. In this way, one end of the disk carrying means 17 is seen on the disk eject/mount port 27, whereby the optical disk Dn can be supplied to a disk mount site without turning the turn table 12.

Figure 6:
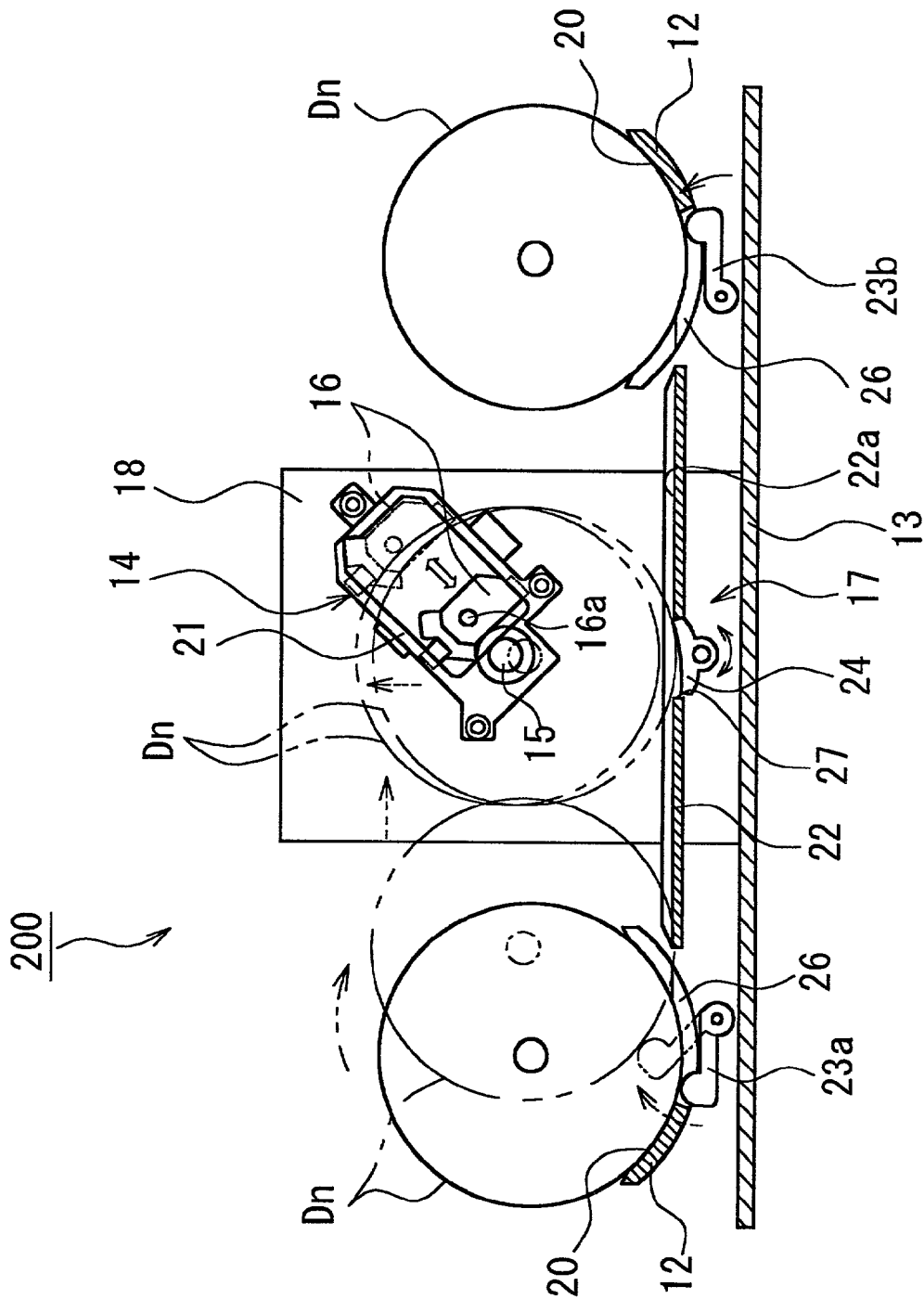
FIG. 6 is a sectional view showing an exemplary mechanism of the DVD/CD changer 200 viewed from an internal side face.

FIG. 6 is a sectional view showing an exemplary configuration when a DVD/CD changer 200 is viewed from an internal side face.

The DVD/CD changer 200 shown in FIG. 6 has an optical pickup unit 16 at the disk drive unit 14. This optical pickup unit 16 is configured so as to be movable relevant to a base chassis 21 in its longitudinal direction. That is, the optical pickup unit 16 is movably supported by means of a feed shaft and a guide shaft provided at the base chassis 21 so as to be parallel to each other. Then, this pickup unit is moved to be guided to both shafts, whereby the pickup unit is close to or distant from a disk table 15. Due to movement of this optical pickup unit 16, an object lens 16a of its optical head moves in a radial direction along an information recording face of an optical disk Dn.

Disk carrying means 17 for carrying an optical disk Dn is provided between the disk drive unit 14 and the turn table 12. This disk carrying means 17 comprises: a carrying rail 22 connecting the inner periphery of the turn table 12 in a diagonal line direction; a pair of disk eject levers 23a and 23b disposed outwardly in the diagonal line direction of this carrying rail 22; and a disk return lever 24 disposed at the substantial center of the carrying rail 22.

A pair of disk eject levers 23a and 23b are configured so as to be projected respectively to each of the disk storage units 20 from the bottom face of the turn table 12. Thus, a slit 26 opened inwardly in the radial direction is provided at each disk storage unit 20 of the turn table 12. This slit 26 is passed, and a disk eject lever 23a (or 23b) is projected upwardly of the turn table 12, whereby an optical disk Dn stored in the disk storage unit 20 is removed to be placed on the carrying rail 22 as shown in FIG. 6.

This carrying rail 22 consists of a rail member that has a guide groove 22a extending in a diagonal line direction on its top face, and is supported by a support frame 18 on which the disk drive unit 14 is mounted. This support frame 18 is fixed on the main chassis 13. Further, a disk return lever 24 is turnably mounted on the support frame 18. This disk return lever 24 is configured so as to be projected from a through hole 27 provided at the carrying rail 22 into the guide groove 22a. The disk return lever 24 is turned in this guide groove 22a, whereby the optical disk Dn discharged from the turn table 12 can be stopped downward of the disk drive unit 14, and the optical disk Dn discharged from the disk drive unit 14 can be discharged to the turn table 12.

Further, the disk return lever 24 is operated to rise while the optical disk Dn is placed, whereby the optical disk Dn is pushed up in predetermined quantity so that the disk can be carried to the disk mount site of the disk drive unit 14. In addition, the optical disk Dn is received at the disk mount site to be lowered to the carrying rail 22, and is turned in a predetermined direction, whereby the optical disk Dn is pushed out by its turning force so that the optical disk Dn can be returned to a predetermined disk storage unit 20.

FIG. 7 is a top face view showing a specific example when the DVD/CD changer 200 is viewed from an internal top face. A leg body 41 enabling height adjustment is mounted at four corners on the lower face of the main chassis 13 of the changer 200 shown in FIG. 7. A table support body 37 is mounted by fixing means such as fixing screw on the top face at the substantial center of the main chassis 13.

This table support body 37 consists of a conical body of which a storage hole 37a is provided at the center. A curved face portion 37b formed in accordance with the shape of the circumferential face of the optical disk Dn to be used is provided at the circumferential face of this table support body 37. A positioning shaft portion (not shown) is provided at the center on the lower face of the table support body 37. This positioning shaft portion is engaged with a reference hole of the main chassis 13, whereby the table support body 37 is positioned relevant to the main chassis 13, and the table support body 37 is set at the substantial center.

Inward support rollers 42 downwardly supporting the inner circumference edge of the turn table 12 are provided at three parts of the skirt portion of this table support body 37. As shown in FIG. 7, three inward support rollers 42 are disposed in a circumferential direction with equally angled intervals. The inward support rollers 42 are rotatably supported in a horizontal direction by means of a support pin (not shown) provided at the table support body 37. An outer flange (not shown) protruded outwardly in a radial direction is provided at the lower part at the outer circumference edge of each of the inward support rollers 42. The inner circumference edge of the turn table 12 is placed in the outer flange of each of these inward support roller 42.

Further, as shown in FIG. 7, a sensor mount piece 37e protruding to the outside is provided at the skirt portion of the table support body 37. At this sensor mount piece 37e, there are provided: a position detecting sensor 43a for controlling a rotational position of the turn table 12 and an address detecting sensor 43b for detecting a slot number that are provided as one example of the detecting means. These detecting sensors 43a and 43b will be described later in detail.

The turn table 12 is formed in a planar doughnut shape, and 300 disk storage units 20 are provided on its top face. 300 disk storage units 20 are provided in the circumferential direction of the turn table 12 with equally angled intervals, and is disposed in a radial manner as a whole. Each disk storage unit 20 consists of a slit shaped recess. Therefore, the width of each disk storage unit 20 is slightly larger than the thickness of an optical disk Dn to be stored. The bottom face portion of the disk storage unit 20 is formed in an arc shape at the recess side suitable to the outer periphery edge of the optical disk Dn.

A continuous outer periphery ring portion in the circumferential direction is provided at the outer circumference edge of this turn table 12. This outer periphery ring portion is supported downwardly by means of six outside support rollers 46 disposed outwardly of the turn table 12. As shown in FIG. 7, 6 outside support rollers 46 are disposed in the circumferential direction with proper intervals. Each outside support roller 46 is rotatably supported by means of the roller support member 47. The roller support member 47 consists of a bracket having a support pin (not shown) protruded in a horizontal direction, and the outside support roller 46 is rotatably mounted at the tip end of this support pin. This roller support member 47 is mounted on the main chassis 13 by fixing means such as fixing screw.

Further, two annular protrusions for use in sensors are concentrically provided inwardly of the outer circumference ring portion of the turn table 12. At a first annular protrusion outwardly positioned, of these circular protrusions, 300 slits which is equal to the number of disk storage units 20 are provided. These 300 slits are provided with equally angled intervals so as to correspond to 300 disk storage units 20. The above described position detecting sensor 43a is mounted on the sensor mount piece 37e corresponding to this first annular protrusion.

In addition, slits whose number is equal to the number of addresses that represent a proper number of disk storage units 20 all together are provided at the second annular protrusion that is inwardly positioned. The number of these addresses can be set as 10 addresses by dividing 300 disk storage units 20 into 10 sections. The above described address detecting sensor 43b is mounted on the sensor mount piece 37e corresponding to this second annular protrusion.

The position of the turn table 12 is detected by means of these position detecting sensor 43a and address detecting sensor 43b, whereby the position control of the turn table 12 can be executed precisely. In this example, a disk sensor 43c is provided near the outside support roller 46 and roller support member 47 responsible for the right side of the turn table 12, viewed from the forward direction of the changer 200 so as to detect whether or not the optical disk Dn is stored in the disk storage unit 20.

Further, as shown in FIG. 7, a table gear 49 that turns one round in the circumferential direction is integrally provided at the outer circumference face of the outer circumference ring portion of the turn table 12. A table turn driving mechanism 50 for turnably driving the turn table 12 is provided at this table gear 49. This table turn driving mechanism 50, as shown in FIG. 7, comprises a table driving motor 51, a gear row 52 having a plurality of gears, and a support bracket 53 or the like. The table driving motor 51 is fixed to be placed on the support bracket 53. The support bracket 53 formed to be bent in a crank shape is fixed to the main chassis 13 by a plurality of fixing screws (not shown).

The gear row 52 of the table turn driving mechanism 50 has an output gear, three intermediate gears each having a large diameter portion and a small diameter portion, and a driving gear. The output gear is fixed to the rotary shaft of the table driving motor 51, and the large diameter portion of the first intermediate gear is meshed with this output gear. A large diameter portion of a second intermediate gear is meshed with a small diameter portion of a first intermediate gear, and a large diameter portion of a third intermediate gear is meshed with a small diameter portion of a second intermediate gear. Further, a driving gear is meshed with a small diameter portion of the third intermediate gear, and this driving gear is meshed with a table gear 49. The first to third intermediate gear and driving gear are turnably supported on four gear axes (not shown) respectively erected at a support bracket 53.

Figure 8:
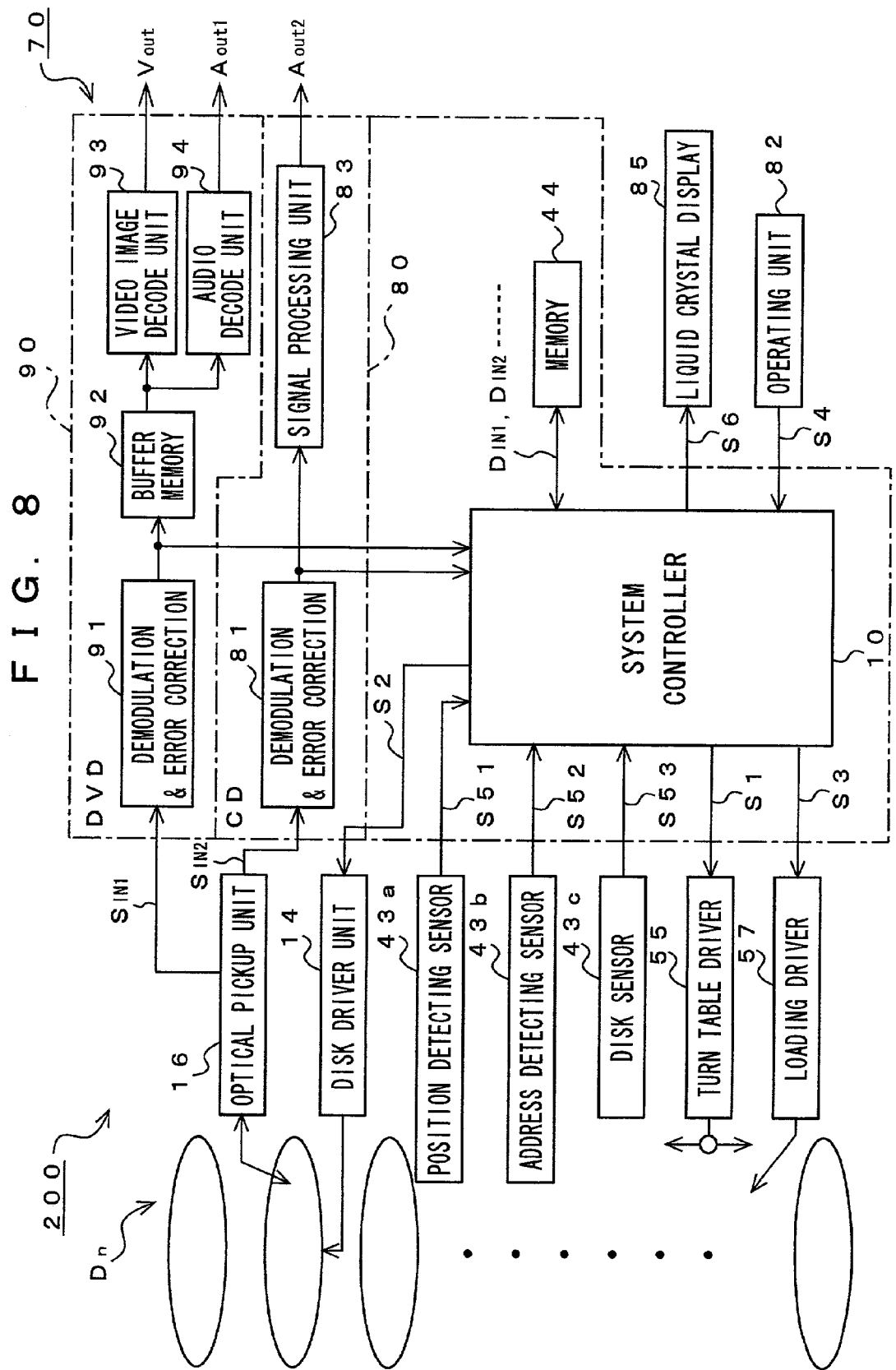
FIG. 8 is a block diagram depicting an exemplary configuration of a control unit 70 of the changer.

Now, a control unit 70 of a DVD/CD changer 200 will be described here. FIG. 8 is a block diagram depicting an exemplary configuration of the control unit 70.

The control unit 70 shown in FIG. 8 is composed of a system controller 10, a memory 44, a CD processing unit 80, and a DVD processing unit 90, for example.

This system controller 10 is provided as an example of control device, and a central processing unit (CPU) and a MPU are used. In the system controller 10 a turn table driver 55 and a loading driver 57 are controlled to detect whether or not an optical disk Dn is stored in a disk storage unit 20, judge an information recording face of an optical disk Dn removed from this disk storage unit 20, mount the optical disk Dn intact on the disk drive unit 14 or invert the optical disk Dn so as to be remounted on the disk drive unit 14 based on the judgment result.

In this example, the optical disk Dn is controlled to be inverted in the following three manners.

a) in the case where the system controller 10 judges that neither of a format capable of recording a signal on both sides nor a CD family is generated with respect to a face SIDE-A;

b) in the case where the system controller 10 does not grasp that a format capable of recording a signal on both sides is generated with respect to a face SIDE-A and whether or not the face SIDE-B can be reproduced; and c) in the case where the system controller 10 grasps that a format capable of recording a signal on both sides is generated with respect to a face SIDE-A, and a face SIDE-B can be reproduced. In this manner, efficient inversion and reproduction can be performed with the DVD/CD changer 200.

An operating unit 82 provided as an example of operating means is connected to this system controller 10. During selection of an arbitrary optical disk Dn or instruction for inverting the disk, a jog dial 82a or an operating button 82b described in FIG. 4 is operated, whereby the position of the disk storage unit 20 is specified for the system controller 10 or the disk is instructed to be inverted. By operating this operating unit 82, a disk operating signal S4 indicative of selection of the optical disk Dn or instruction for inverting the disk is output to the system controller 10.

A position detecting sensor 43a, an address detecting sensor 43b, and a disk sensor 43c that are provided an example of detecting means are connected to the system controller 10 apart from the operating unit 82. The position detecting sensor 43a is provided so as to detect a position of a disk storage unit 20 specified by the operating unit 82 and output a position detecting signal S51 to the system controller 10. The address detecting sensor 43b is provided so as to detect a storage address (slot number) of an optical disk Dn specified by the operating unit 82 and output an address detecting signal S52 to the system controller 10. A disk sensor 43c is provided so as to detect whether or not an optical Dn is stored in the disk storage unit 20 specified by the operating unit 82 and output a storage enable/disable detecting signal S53 to the system controller 10.

This system controller 10 handles a disk shaped optical disk Dn of single sided recording system and double sided recording system based on the disk operating signal S4, position detecting signal S51, address detecting signal S52, and storage enable/disable detecting signal S53 or the like. An optical disk Dn of single sided recording system is handled as the optical disk Dn such as a CD family such as CD, VCD, SVCD, or SACD or a DVD of double sided recording system.

The system controller 10 is provided so as to generate a turn control signal S1, a write/readout control signal S2, a carrying control signal S3 or the like based on the disk operating signal S4, position detecting signal S51, address detecting signal S52, storage enable/disable detecting signal S53 or the like. A turn table driver 55 for driving the table turn driving mechanism 50 described in FIG. 7 is connected to the system controller 10, and the turn control signal S1 is supplied. A turn table driver 55 is provided so as to turn the turn table 12 clockwise or counterclockwise in each slot based on the turn control signal S1. The disk drive unit 14 is connected to the system controller 10, and the write/readout control signal S2 is supplied. The disk drive unit 14 is provided so as to mount an optical disk Dn and record and/or reproduce an information signal SIN based on the write/readout control signal S2.

In addition, a loading driver 57 for driving disk carrying means 17 described in FIG. 6 is connected to the system controller 10, and the carrying control signal S3 is supplied. The loading driver 57 carries an optical disk Dn to be mounted from disk storage unit 20 of one side of the turn table 12 to the disk drive unit 14 based on the carrying control signal S3 or carries the optical disk Dn so as to be eject from the disk drive unit 14 to the disk storage unit 20 of another side. In addition, the optical disk Dn removed from disk storage unit 20 of one side of the turn table 12 to the disk drive unit 14 may be carried so as to be ejected to an source disk storage unit 20.

In this example, in the case handling an optical disk Dn of single sided recording system, the system controller 10 mounts the optical disk Dn removed from the disk storage unit 20 on the disk drive unit 14, detects an information signal SIN recorded at a predetermined position of the optical disk Dn, and judges whether or not the disk face is an information recording face based on detection of the information signal SIN.

In this example, in the case where an information recording face of an optical disk Dn of one sided recording system is mounted to be oriented opposite to the disk drive unit 14, the optical disk Dn is ejected to the turn table 12 by means of the system controller 10, the turn table 12 is inverted, and then, the information recording face of the optical disk Dn is provided so as to be mounted to he disk drive unit 14.

In addition, in the case of handling a disk shaped optical disk Dn of double sided recording system, the system controller 10 is provided so as to mount the optical disk Dn removed from the disk storage unit 20 on the disk drive unit 14, detect an information signal SIN recorded at a predetermined position of the optical disk Dn, judge whether or not the disk face is an information recording face based on detection of the information signal SIN, and judge whether both disk faces are information recording faces, only one disk face is an information recording face or both disk faces are non-information recording faces. This is because information may be recorded on a single face or may not be recorded even in an optical disk Dn such as DVD.

Further, in the case where reproduction sequence information is registered in advance with respect to a optical disk Dn of double sided recording system, the system controller 10 is provided so as to mount the optical disk Dn removed from the disk storage unit 20 on the disk drive unit 14, detect reproduction sequence information from an information signal SIN recorded at a predetermined position of the optical disk Dn, and judge whether the disk face is an information recording face of a first reproduction sequence or an information recording face of a second reproduction sequence based on detection of the reproduction sequence information. This is because, in the case where video image information having its continuity is recorded on both disk faces, information of the second reproduction sequence is intended to be sequentially reproduced after information of the first reproduction sequence is reproduced.

In the case where the first information recording face of the optical disk Dn of double sided recording system is mounted to be oriented opposite to the disk drive unit 14, the system controller 10 is provided so as to eject the optical desk Dn to the turn table 12, invert the turn table 12, and then, mount the first information recording face of the optical disk Dn toward the disk drive unit 14. This is because an information signal SIN must be reproduced in correct reproduction sequence.

Further, in the case where memory 44 provided as an example of a nonvolatile storage unit is connected to the system controller 10, for example, operating unit 82 instructs the optical disk Dn to be selected or inverted for example, the storage unit is provided to store storage position information DIN1 indicative of a storage position of the optical disk Dn on the turn table 12 and judgment result information DIN2 of the information recording face of the optical disk Dn or the like. A RAM for working memory as well as a flash memory such as EEPROM may be used for the memory 44. The system controller 10 is provided so as to judge necessity of inverting the optical disk Dn based on the storage position information DIN1 and judgment result information DIN2 read out from the memory 44. This is because a response time during reproduction must be accelerated.

In addition, the system controller 10 is provided so as to rewrite a storage position information DIN1 every time the storage position of the optical disk Dn changes. This is because the optical disk Dn is intended to be mounted precisely during next reproduction even if the storage position changes because of rearrangement of the optical disks Dn.

A liquid crystal display 85 that is provided as an example of display means is connected to the system controller 10 so as to display a video image and/or audio indicative of an inverting operation of the optical disk Dn in progress based on a display control signal S6 in order to eliminate user's uneasiness. The display control signal S6 is supplied from the system controller 10 based on the disk operating signal S4, position detecting signal S51, address detecting signal S52, storage enable/disable detecting signal S53 or the like. Apart from the liquid crystal display 85, an OSD (On Screen Display) or LED, a fluorescent display (FL) tube and the like for character display may be used for display means.

An optical pickup unit 16 is provided at the disk drive unit 14. For example, when an optical disk Dn such as DVD is mounted, a video image or audio encoded signal SIN1 are read out. When an optical disk such as CD family is mounted, an audio encoded signal SIN2 is read out. A CD processing unit 80 and a DVD processing unit 90 are connected to the optical pickup unit 16. The DVD processing unit 90 has a modulation & error correction unit 91, a buffer memory 92, a video image decode unit 93, and an audio decode unit 94 or the like.

The demodulation & error correction unit 91 of the DVD processing unit 90 demodulates a video image and audio encoded signal SIN1 read out by the optical pickup unit 16, and stores in the buffer memory 92 the digital video image and audio information after error corrected. The video image decode unit 93 and audio decode unit 94 are connected to the buffer memory 92. The video image decode unit 93 detects video image information from video image and audio information. This video image information is subjected to color processing and digital/analog conversion processing or the like, and a video signal VOUT is output. The audio decode unit 94 detects audio information from video image and audio information. This audio information is subjected to digital/analog conversion processing or the like, and an audio signal AOUT1 is output to a monitor or the like together with the video signal VOUT.

The CD processing unit 80 has a demodulation & error correction unit 81 and a signal processing unit 83. The demodulation & error correction unit 81 of the CD processing unit 80 demodulates an audio encoded signal SIN2 read out by the optical pickup unit 16, and outputs to the signal processing unit 83 the digital audio information after error corrected. The signal processing unit 83 subjects the audio information to digital/analog conversion processing or the like, and outputs an audio signal AOUT2 to a reproduction deck or the like.

In this example, in order to judge an information recording face when an optical disk Dn is mounted, an information signal SIN read out from a predetermined recording region by the optical pickup unit 16 is demodulated, and digital control information after error corrected is output to the system controller 10. This is because, in the case where a label face has been detected, it is required to invert a disk Dn. At this time, the judgment result information DIN1, DIN2, . . . may be displayed on an external monitor or the like.

FIG. 9 is an imaginary view showing a recording example of a memory 44 for managing judgment result information. In the recording example shown in FIG. 9, as types of optical disks Dn mounted on slot numbers 1 to 300, for example, DVD, CD, VCD, SVCD, SACD or the like is recorded together with such slot numbers. States of information recording faces SIDE-A and SIDE-B are recorded relevant to these optical disks Dn of double sided recording system and single sided recording system. Here, the face SIDE-A denotes a reproduction target face before inverted, and the face SIDE-B denotes a reproduction target face after inverted.

In an optical disk Dn of single sided recording system such as CD family, the faces SIDE-A and SIDE-B are guaranteed as an information recording face, a label face, respectively. Therefore, with respect to the face SIDE-A, in the case where it is judged that the reproduction target face before inverted is a label face as a result of disk check, there is a high possibility that the face SIDE-B is an information recording face, and thus, an inversion control is executed. When a write type CD is unrecorded, the face SIDE-A is a non-information recording face.

In an optical disk Dn of double sided recording system such as DVD, in the case where both of the faces SIDE-A and SIDE-B are information recording faces, either of the faces SIDE-A and SIDE-B may be an information recording face. When the disk is unrecorded, both of the faces SIDE-A and SIDE-B may be a non-information recording face. For example, with respect to the face SIDE-A, in the case where a disk has such format by which an information signal SIN can be recorded on both sides, an inversion control is executed in the case where the face SIDE-B can be reproduced or undefined. In the case where it is recognized that only the face SIDE-A can be reproduced, an inversion control is not executed. In the case where it is recognized that both faces SIDE-A and SIDE-B can be reproduced, and inversion control is executed. A dummy slot is undefined because the optical disk Dn is not mounted.

The recording of memory 44 may be performed in a file format without being limited to the above recording example. For example, filing may be performed by first classifying optical disks Dn into DVD group and CD family or the like and further classifying the CD family into a write type CD group, a VCD group, a SVCD group, or SACD group and the like. Speedy reproduction can be performed during next reproduction.

Figure 10:
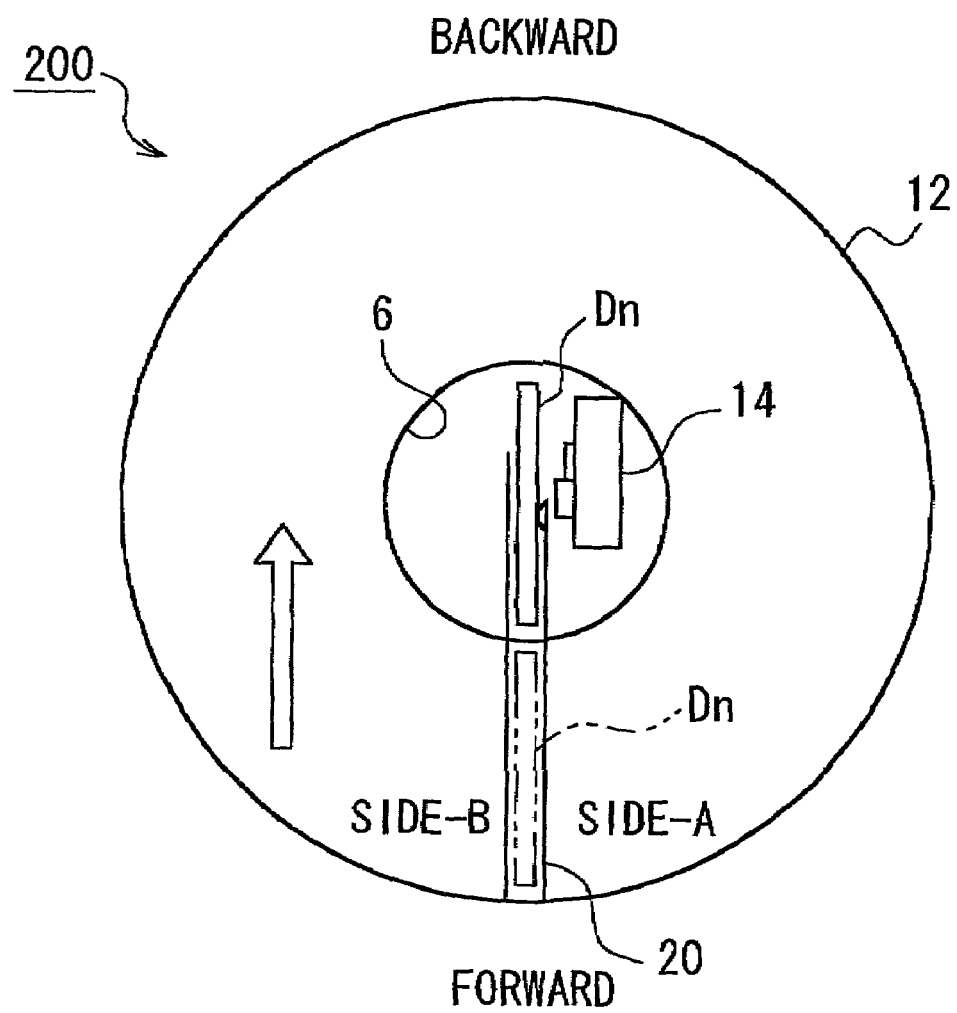
FIG. 10 is a conceptual view showing a control example during disk mounting (forward side)
Figure 11:
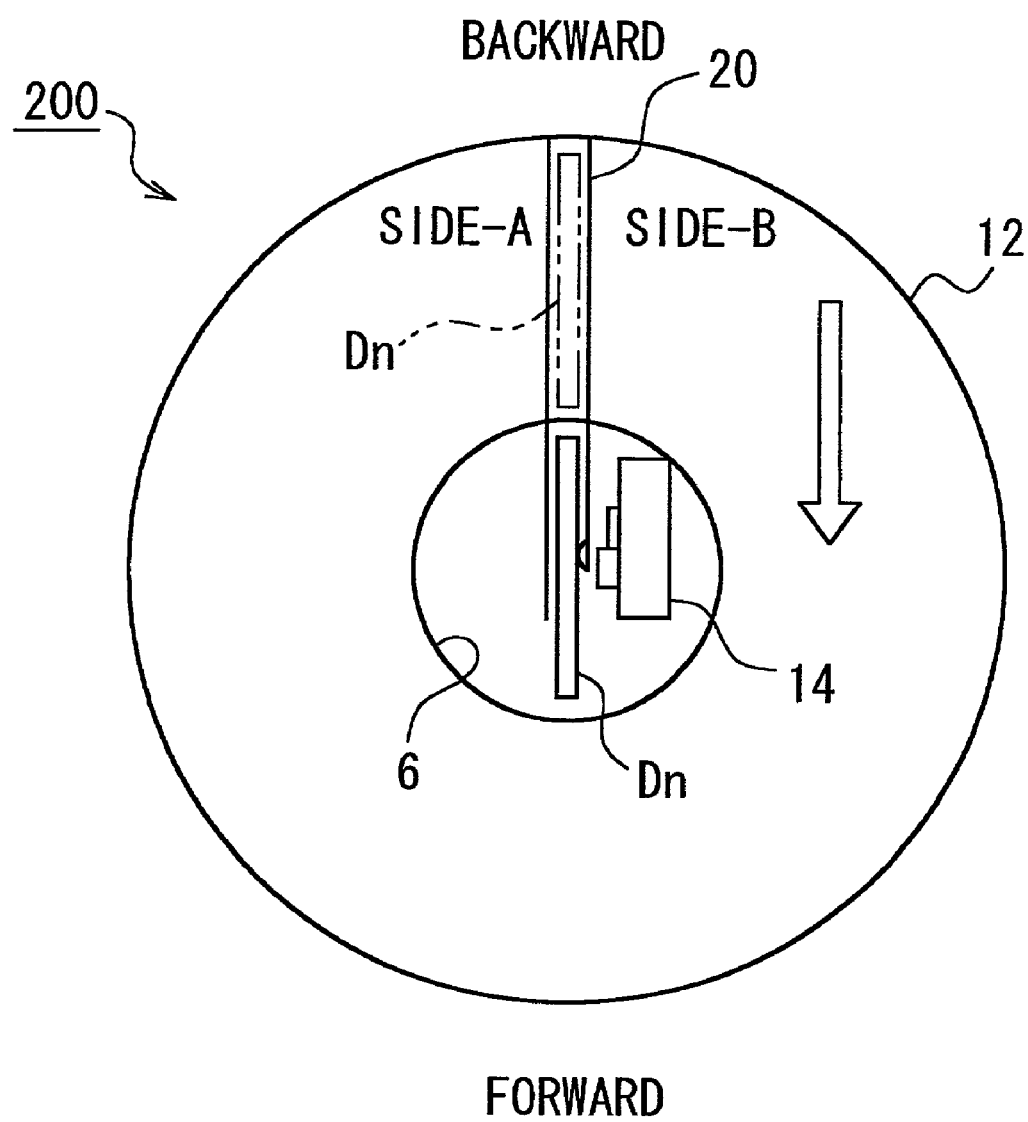
FIG. 11 is a conceptual view showing a control example during disk mounting (backward side)

Now, a control example of the DVD/CD changer 200 will be described here. FIG. 10 is a conceptual view showing a control example when an optical disk is mounted (forwardly). FIG. 11 is a conceptual view showing a control example when an optical disk is mounted (backwardly).

First, an opening/closing door 36 shown in FIG. 4 is opened to open a disk eject/mount port 40, and a proper number of optical disks Dn are stored in arbitrary disk storage units 20 of a plurality of disk storage units 20 provided at a turn table 12. 300 disk storage units 20 are provided at this turn table 12 so that each of the optical disks Dn can be stored in each of the disk storage units 20. Therefore, in the present embodiment, a maximum of 300 optical disks Dn can be stored one time. The size of optical disk Dn to be used is generally a disk shaped optical disk Dn of 12 cm in diameter. However, an optical disk Dn of 8 cm in diameter can be used by employing an adapter.

A work of storing an optical disk Dn in each disk storage unit 20 of the turn table 12 is manually done by the user. When the disk eject/mount port 40 is opened by pulling the opening/closing door 36 toward the user, the frontal portion of the turn table 12 is exposed. In this state, an held optical disk Dn is inserted into a disk eject/mount port 40 toward the longitudinal direction, and the disk is stored in an arbitrary disk storage unit 20. At this time, specific position numbers (1 to 300 in the present embodiment) and address numbers (addresses 1 to 10) are assigned to each of disk storage units 20. Thus, information concerning the stored optical disks Dn is associated with the position number and address number so as to be recorded in the memory 44.

In addition, in the case where a plurality of optical disks Dn are stored, an operating unit 82 provided on the front face of a front panel 35 or the like (such as jog dial 82a or operating button 82b, for example) is operated, thereby turning the turn table 12 in an arbitrary direction. Then, an optical disk Dn is stored in a vacant disk storage unit 20. When the optical disk Dn is stored in the disk storage unit 20 of the turn table 12 in this way, each optical disk Dn is placed on the turn table 12 while the disk Dn is substantially vertically erected. In this manner, an arbitrary optical disk Dn can be automatically operated to be reproduced by selecting it.

Reproducing operation of this optical disk Dn is made by a disk loading process and a disk chucking process. The disk loading process performs an operation for removing an optical disk Dn from a disk storage unit 20 to be carried to a disk mount site or returning the optical disk Dn from the disk mount site to the disk storage unit 20. This disk loading process can be performed from the rear side of the changer 200 or can be performed from the front side of the changer. The forward and backward relationship between rear side loading and front side loading can be arbitrary set.

The present embodiment describes a case in which front side loading and rear side loading are performed in order. In addition, the disk chucking process performs an chucking operation of an optical disk Dn carried to the disk mount site for a disk table 74 or releasing operation of such chucking.

In addition, in the present embodiment, in the case where a disk drive unit 14 is provided at the right of a base unit (center hole portion) 6 shown in FIG. 5 when viewed from the front panel 35 shown in FIG. 4, in the case of an optical disk Dn of double sided recording system shown in FIG. 10, and in the case where both of the faces SIDE-A and SIDE-B are information recording faces, when the optical disk Dn is mounted from the disk storage unit 20 at the front side of the turn table 12, the face SIDE-A is mounted toward the disk drive unit 14. The face SIDE-A can be reproduced at the disk drive unit 14.

After this optical disk Dn has been returned to an source disk storage unit 20, when the turn table 12 is turned clockwise by 180 degrees, for example, the disk storage unit 20 having the optical disk Dn stored therein moves backwardly as shown in FIG. 11. In FIG. 11, when an optical disk Dn is mounted backwardly of the turn table 12, the face SIDE-B is mounted toward the disk drive unit 14. In the disk drive unit 14, the face SIDE-B can be reproduced. With this being presumed, the following five cases will be described.

[1] Basic Operation

Figure 12A:
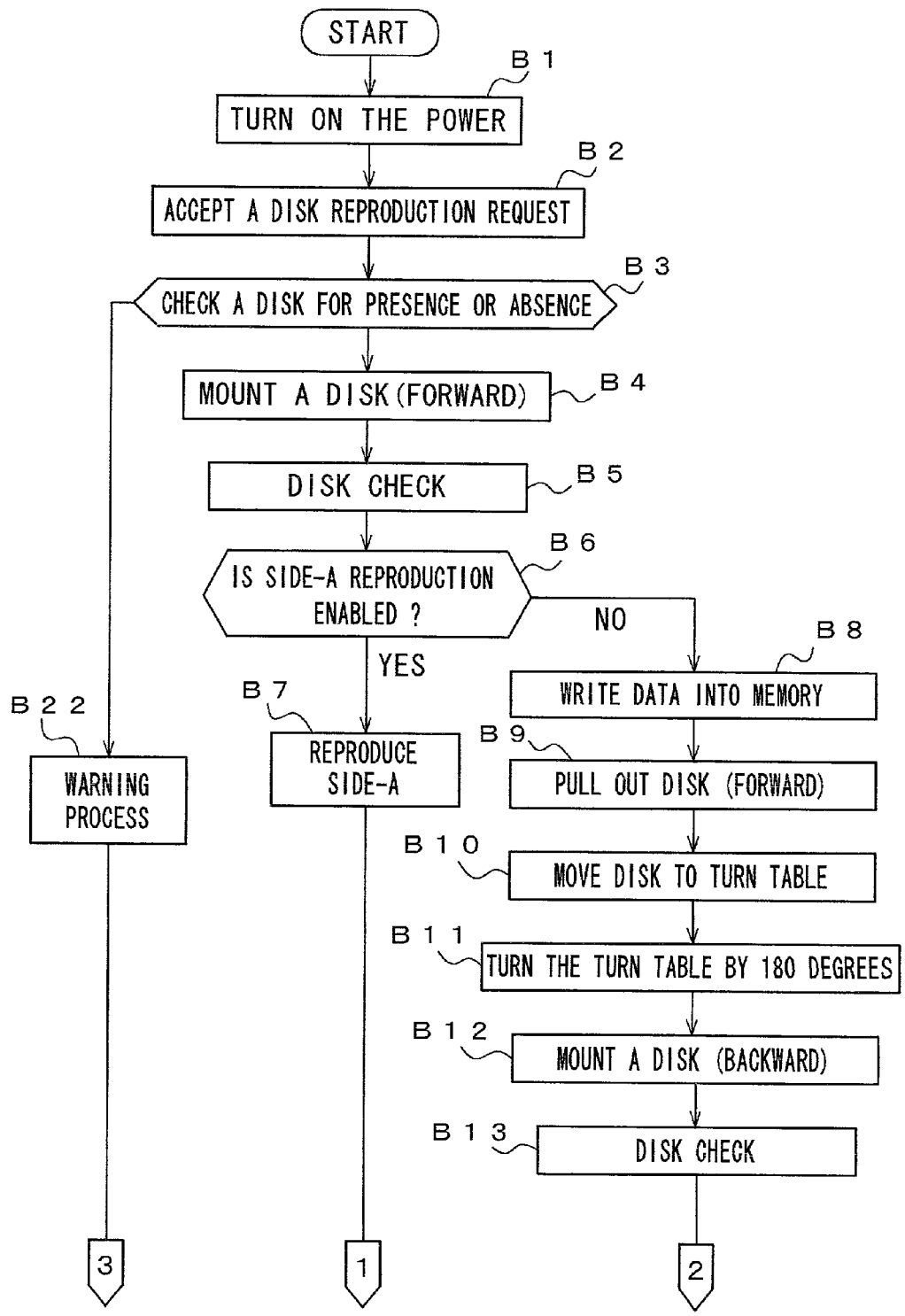
FIG. 12A and FIG. 12B are flow charts each showing an exemplary basic operation of the DVD/CD changer 200.
Figure 12B:
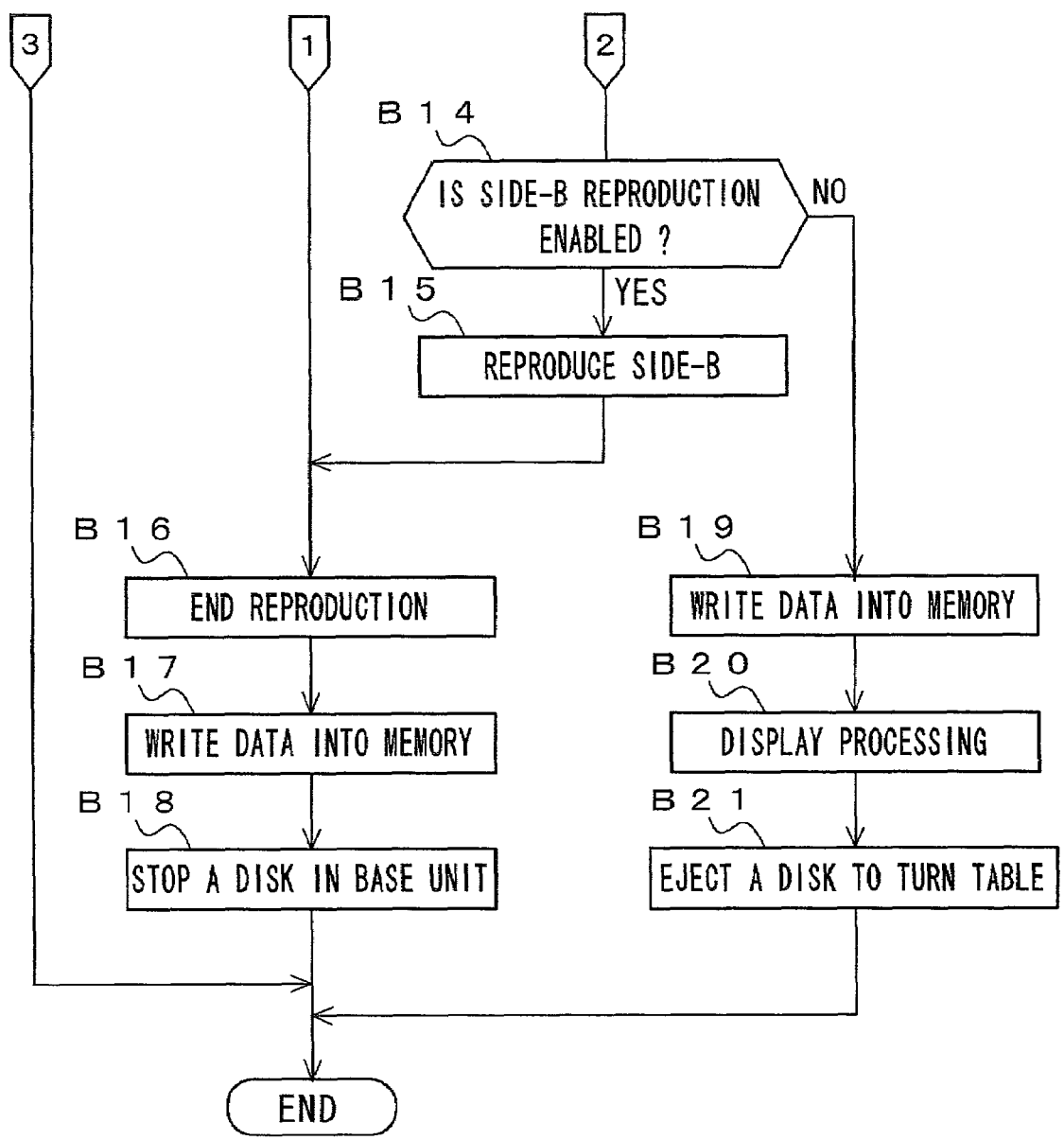

FIG. 12A and FIG. 12B are flow charts each showing an exemplary basic operation of a DVD/CD changer 200.

This example presumes that, in the case where both faces of optical disk Dn is a non-information recording face, the optical disk Dn is ejected (automatically ejected) to the turn table 12, and in the case where either one is an information recording face, the optical disk Dn stops at a base unit 6 after the reproducing operation has completed.

With this being presumed, at the step B1 of the flow chart shown in FIG. 12A, the user turns ON the power source of the changer 200, and performs a disk reproducing operation. For example, the user operates an operating unit 82 in order to select the optical disk Dn. When the optical disk Dn is selected, a disk operating signal S4 is output from the operating unit 82 to the system controller 10, whereby the position of the disk storage unit 20 is specified.

This specification is accepted as a request for disk reproduction by means of the system controller 10 at the step B2. At the system controller 10, at the step B3, it is detected by a disk sensor 43c whether or not the optical disk Dn is stored in the disk storage unit 20 associated with the specification. Here, with respect to the disk storage unit 20 specified by the operating unit 82, it is detected by the disk sensor 43c whether or not the optical disk Dn is stored, and a storage enable/disable detection signal S53 is output to the system controller 10. In the case where the optical disk Dn is present in the disk storage unit 20, a storage enable/disable detecting signal S53 at a level H is output. In the case where the disk is absent from the disk storage unit 20, a storage enable/disable detecting signal S53 at a level L is output.

Therefore, in the case where the optical disk Dn is stored in the specified disk storage unit 20, processing goes to the step B4 at which the system controller 10 is provided so as to output a carrying control signal S3 to a loading driver 57 and mount an optical disk Dn from the disk storage unit 20 at the front side of the turn table 12 to the disk drive unit 14 based on this carrying control signal S3.

At this time, a first disk removing lever 23a disposed at one side of a direction of the diagonal lines of the turn table 12 shown in FIG. 6 is operated, and an optical disk Dn is removed from the disk storage unit 20, whereby the optical disk Dn is guided to a guide groove 22a of a carrying rail 22, and moves to the center of a base chassis 13. When the optical disk Dn reaches the substantial center, the disk is lifted by means of a disk return lever 24, and is carried to the disk mount site of the disk drive unit 14.

The thus carried optical disk Dn is mounted on a disk table 15, and is driven to be rotated. Then, at the step B5, one information recording face (for example, face SIDE-A=Da) of the optical disk Dn is provided for reproducing operation caused by an optical pickup unit 16, and reproduction of the information signal SIN recorded in advance is executed. This is because, if the information recording face of the optical disk Dn is oriented to the disk drive unit, the information signal SIN recorded at the predetermined position can be detected (hereinafter, referred to as disk check).

Then, at the step B6, it is judged whether or not the disk face (face SIDE-A) is an information recording face based on the detection result. In the case where the disk face is an information recording face based on the judgment result, processing goes to the step B7 at which an information signal SIN being information recording contents is reproduced while the optical disk Dn is mounted intact on the disk drive unit 14.

In the case where the disk face (face SIDE-A) is not an information recording face at the step B6, processing goes to the step B8 at which the fact that the disk face (face SIDE-A) is not an information recording face is written into a memory 44. Then, processing goes to the step B9 at which the optical disk Dn is pulled out forwardly from the disk drive unit 14 by means of a loading driver 57. At this time, the optical disk Dn is released from the disk table 15, and is placed on the disk return lever 24. Then, the optical disk is returned onto a carrying rail 22 together with the disk return lever 24. In addition, at the step B10, the optical disk Dn is discharged by a turning movement of the disk return lever 24, and is ejected to the source disk storage unit 20 of the turn table 12.

Then, a turn control signal S1 is output from the system controller 10 to a turn table driver 55, and the turn table 12 having the optical disk Dn stored therein is turned (inverted) by 180 degrees at the step B11. Then, at the step B12, the optical disk Dn is mounted by means of the loading driver 57 from the disk storage unit 20 at the rear side of the turn table 12 to the disk drive unit 14. At this time, a second disk removing lever 23b disposed at the other side of a direction of the diagonal lines shown in FIG. 6 is operated so as to remove the optical disk Dn from the disk storage unit 20.

In this manner, the optical disk Dn is guided to a guide groove 22a of a carrying rail 22 while its top and bottom faces are reversed, and moves to the center of the main chassis 13. Then, as in the above described case, after the optical disk Dn has reached the substantial center, the disk is lifted by means of the disk return lever 24, and is carried to the disk mount site of the disk drive unit 14 in the same way. As a result, the optical disk Dn can be remounted so that the face SIDE-B is oriented to an opposite side, i.e., the disk drive unit 14.

Then, the optical disk Dn removed from the disk storage unit 20 is mounted on the disk drive unit 14, and the optical disk Dn is disk checked at the step B13. Thereafter, based on the detection result, at the step B14 shown in FIG. 12B, it is judged whether or not the disk face (for example, face SIDE-B=Db) is an information recording face. If it is detected that the disk face (face SIDE-B) is an information recording face based on the judgment result, processing goes to the step B15 at which the information signal SIN is reproduced while the optical disk Dn is mounted intact on the disk drive unit 14. After the optical disk Dn associated with this inversion has been reproduced, processing goes to the step B16.

At the step B16, the end of reproduction is displayed on a liquid crystal display 85, for example. The end of reproduction may be displayed on an LED or FL tube without being limited to a liquid crystal display 85. Then, processing goes to the step B17 at which storage position information DIN1 and judgment result information DIN2 or the like are recorded in the memory 44 as management information concerning an information recording face of the optical disk Dn. This is because a response time (response) must be accelerated in next information reproducing or the like. Then, processing goes to the step B18 at which the optical disk Dn stops in the base unit 6. This is because a second reproduction instruction may be supplied by a next operation.

In the case where the disk face (face SIDE-B) is not an information recording face at the step B14, processing goes to the step B19 at which a message of "No disk face is an information recording face" or "undefined" is recorded in the memory 44. Then, processing goes to the step B20 at which the fact is displayed on the liquid crystal display 85 or LED or FL tube and the like. This is because an unrecorded optical disk or the like in which no information is recorded may be mounted. Thereafter, processing goes to the step B21 at which an optical disk Dn is ejected to the turn table 12. At this time, the optical disk Dn is released from the disk table 15, and is placed on the disk return lever 24. Then, the disk is returned onto the carrying rail 22 together with the disk return lever 24, and is discharged by a turning movement of the disk return lever 24 to be returned to the source disk storage unit 20.

In addition, in the case where the optical disk Dn is stored in the disk storage unit 20 specified at the step B3 of the flow chart shown in FIG. 12A, processing goes to the step B22 at which processing for warning that no optical disk Dn is present in a slot of its specified address is executed. This warning process outputs a display control signal S6 to the liquid crystal display 85, whereby a message indicating that no optical disk Dn is present in a slot of its specified address is displayed. Apart from the liquid crystal display 85, an LED may be blinked. This is because the user is prompted to issue a instruction again.

Therefore, even in the case where an information recording face of a disk shaped recording medium Dn of single sided recording system is mounted to be oriented opposite to the disk drive unit 14, the user inverts the turn table 12 having the optical disk Dn stored therein without removing the optical disk Dn from the changer 200, whereby the information recording face can be mounted toward the disk drive unit 14.

[2] During a Request for Disk Ejection

Figure 13:
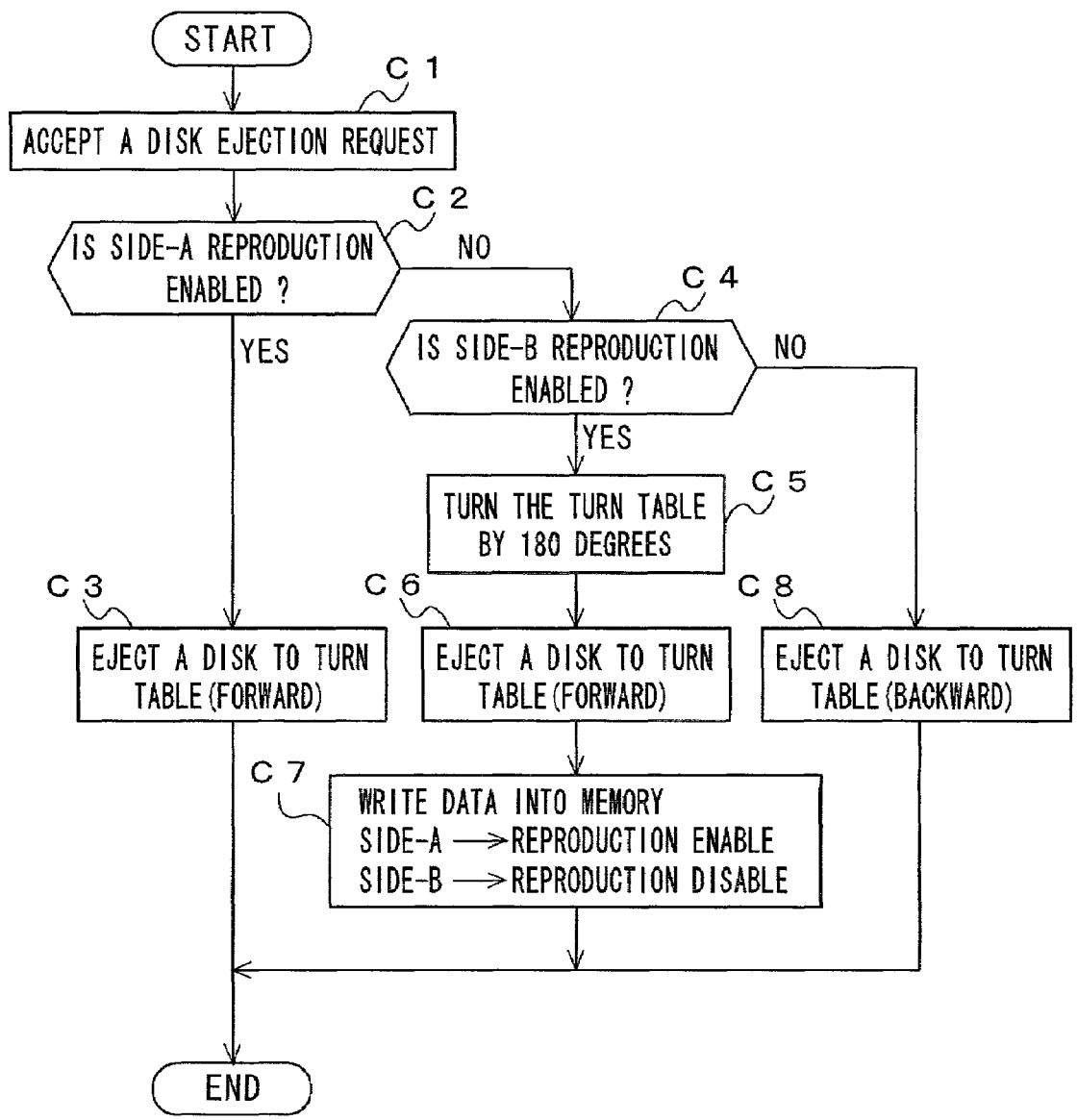
FIG. 13 is a flow chart showing a control example during a request for ejecting the disk.

FIG. 13 is a flow chart showing a control example during a request for disk ejection. This example presumes that, in the case where the face SIDE-A mounted from the front side has been successfully reproduced, an optical disk Dn is ejected to the source front side disk storage unit 20. In addition, the example presumed that, in the case where the face SIDE-B mounted from the rear side has been successfully reproduced, the optical disk Dn is ejected to the frontal side after the turn table 12 has been inverted while the disk is mounted. Further, the example presumes that, in the case where the face SIDE-B mounted from the rear side has not been successfully mounted, the optical disk Dn is ejected to the source rear side disk storage unit 20 of the turn table 12.

With this being presumed, when the user operates an operating unit 82 and instructs a request for disk ejection, such disk ejection request is accepted by the system controller 10 at the step C1 of the flow chart shown in FIG. 13. The system controller 10 judges whether or not the face SIDE-A of the optical disk Dn can be reproduced at the step C2. In the case where the face SIDE-A can be reproduced, processing goes to the step C3 at which the system controller 10 is provided so as to output a carrying control signal S3 to the loading driver 57 and eject the optical disk Dn from the disk drive unit 14 to the source disk storage unit 20 at the front side of the turn table 12 based on the carrying control signal S3.

In addition, in the case where the face SIDE-A of the optical disk Dn cannot be reproduced at the step C2, processing goes to the step C4 at which the system controller 10 judges whether or not the face SIDE-B can be reproduced. In the case where the face SIDE-B can be reproduced, processing goes to the step C5 at which a turn control signal S1 is output from the system controller 10 to the turn table driver 55, and the turn table 12 having the optical disk Dn stored therein is turned (inverted) by 180 degrees at the step C5. Then, at the step C6 the optical disk Dn is ejected by means of the loading driver 57 from the disk drive unit 14 to the disk storage unit 20 at the front side of the turn table 12. The optical disk Dn whose posture is changed by 180 degrees can be ejected to the disk storage unit 20 of the same address.

Then, at the step C7, with respect to the optical disk Dn, reproductions enable and disable are recorded on the faces SIDE-A and SIDE-B, respectively. The contents of judgment are displayed on the liquid crystal display 85. At the step C4, in the case where the face SIDE-B cannot be reproduced, processing goes to the step C8 at which the optical disk Dn is ejected by the loading driver 57 from the disk drive unit 14 to the disk storage unit 20 at the rear side of the turn table 12. This is because an unrecorded optical disk or the like in which no information is recorded may be mounted.

In this way, in the case where only the face SIDE-A can be reproduced in an optical disk Dn of single sided recording system, and the face SIDE-B after inverted cannot be reproduced physically or logically, the disk is ejected to the source disk storage unit 20 having the disk mounted therein. In the case where only the face SIDE-B can be reproduced in this optical disk Dn, the face SIDE-B is ejected as the face SIDE-A. Therefore, when the optical disk Dn is reproduced at a second time, the face SIDE-A is obtained as a reproduction enable face, which does not require any inverting operation. Thus, a time for starting reproduction can be reduced.

In the case of double sided recording system, the disk is ejected to the source disk storage unit 20 having the side mounted therein while the face SIDE-B is defined as the face SIDE-B. Therefore, when the optical disk Dn is reproduced at a second time, reproduction is enabled from the start of the face SIDE-A, and the reproduction enable faces can be arranged in the same direction in the changer 200. In this manner, a time for starting reproduction can be reduced.

[3] During Request for Disk Inversion

Figure 14:
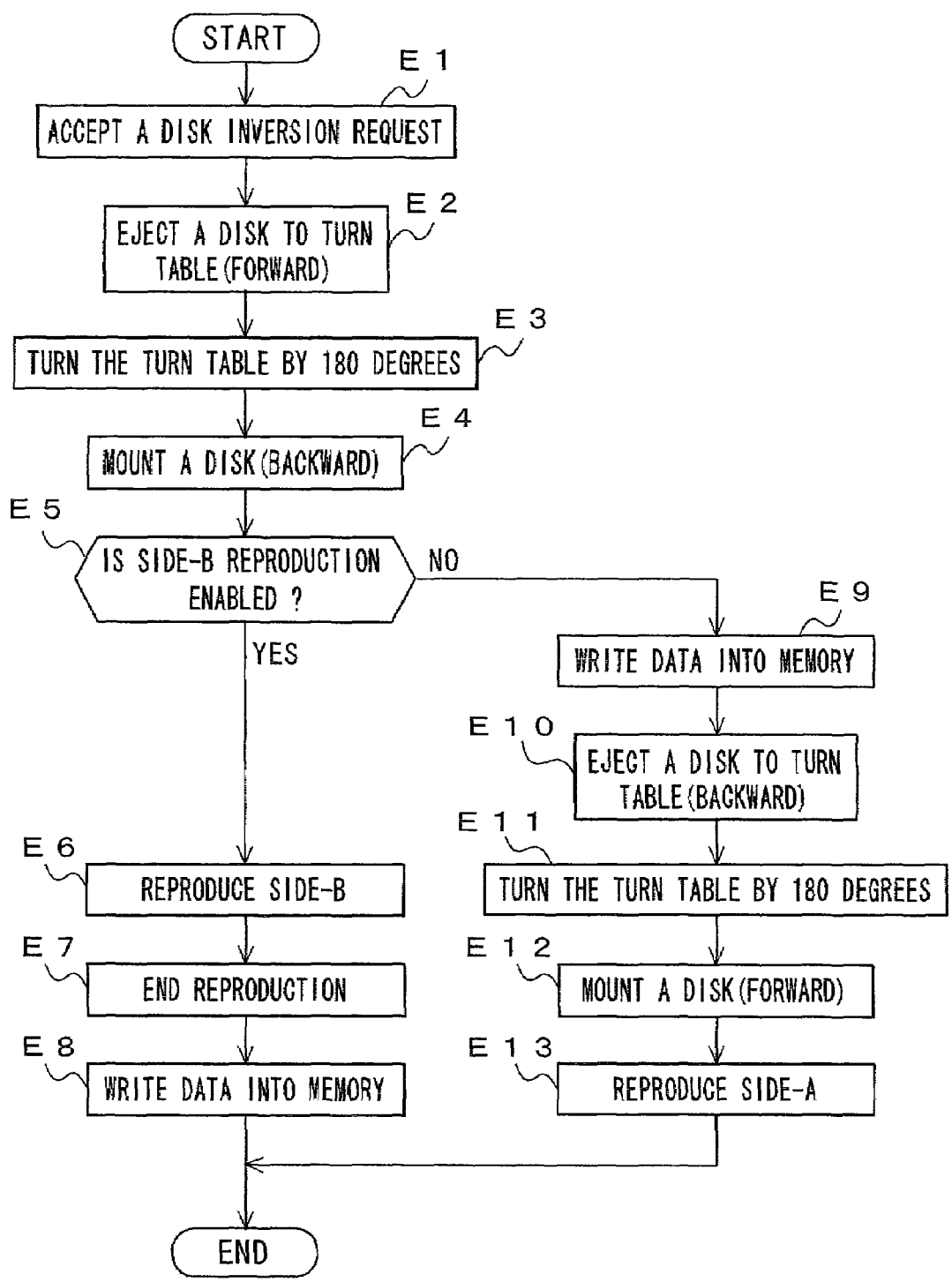
FIG. 14 is a flow chart showing a control example during a request for inverting the disk.

FIG. 14 is a flow chart showing a control example during a request for disk inversion. This example presumes that, in the case where an instruction for inverting an optical disk Dn is supplied, the necessity of inverting the optical disk Dn is judged based on the storage position information DIN1 and judgment result information DIN2 that have been stored in advance.

For example, in the case where an inversion request has been made, if the judgment result information DIN2 that a disk face after disk inverted cannot be reproduced is held, no inversion control is executed. In the case an optical disk Dn associated with the face SIDE-A is a CD family, it is guaranteed that the face SIDE-B is a label face. Thus, no inversion control is executed. In the case where the judgment result information DIN2 that a disk face after disk inverted can be reproduced is held, an inversion control is executed. By doing this, even in the case where a next inversion request has been made, if the face SIDE-B cannot be reproduced, no inversion control is executed. Thus, an efficient inversion control can be performed.

In the case of double sided recording system there exist a number of optical disks Dn each having navigation such that a menu screen is restored after the end of single sided reproduction. Thus, in the case where an inversion request has been made for the system controller 10, an inversion control is executed. Of course, a video image concerning an inverting operation of the optical disk Dn in progress is displayed or a video image concerning a case in which there is no need for such inversion is displayed on the liquid crystal display 85.

With this being presumed, when the user operates an operating unit 82, thereby issuing a disk inversion request, such disk inversion request is accepted by the system controller 10 at the step E1 of the flow chart shown in FIG. 14. In the system controller 10, at the step E2, an optical disk Dn is pulled out forwardly from the disk drive unit 14 by means of the loading driver 57. At this time, the optical disk Dn is released from the disk table 15, and is placed on the disk return lever 24. Then, the disk is returned onto the carrying rail 22 together with the disk return lever 24. In addition, the optical disk Dn is discharged by a turning movement of the disk return lever 24, and is ejected to the source disk storage unit 20 of the turn table 12.

Thereafter, a turn control signal S1 is output from the system controller 10 to the turn table driver 55, and the turn table 12 having the optical disk Dn stored therein is turned (inverted) clockwise by 180 degrees at the step E3. Then, at the step E4, the optical disk Dn is mounted by means of the loading driver 57 from the disk storage unit 20 at the rear side of the turn table 12 to the disk drive unit 14. At this time, the second disk removing lever 23*b* disposed in a direction of the other one of diagonal lines shown in FIG. 6 is operated so as to remove the optical disk Dn from the disk storage unit 20.

In this manner, the optical disk Dn is guided to the guide groove 22*a* of the carrying rail 22 while the top and bottom faces are reversed, and moves to the center of the main chassis 13. As in the above described case, after the optical disk Dn has reaches the substantial center, the disk is lifted by means of the disk return lever 24, and is carried to the disk mount site of the disk drive unit 14 in the same way. As a result, the optical disk Dn can be remounted so that the face SIDE-B is oriented to an opposite side, i.e., toward the disk drive unit 14.

Then, at the step E5, it is judged whether or not the disk face (face SIDE-B) is an information recording face. In the case where the disk face is an information recording face based on the judgment result, processing goes to the step E6 at which an information signal SIN being information recording contents is reproduced while the optical disk Dn is mounted intact on the disk drive unit 14. Then, when reproduction terminates at the step E7, processing goes to the step E8 at which the fact that the disk face (face SIDE-B) is an information recording face is written into the memory 44.

In the case where the disk face (face SIDE-B) is not an information recording face at the step E5, processing goes to the step E9 at which the fact that the disk face (face SIDE-B) is not an information recording face is written into the memory 44. Then, processing goes to the step E10 at which an optical disk Dn is pulled out backwardly from the disk drive unit 14 by means of the loading driver 57. At this time, the optical disk Dn is released from the disk table 15, and is placed on the disk return lever 24. Then, the disk is returned onto the carrying rail 22 together with the disk return lever 24. In addition, the optical disk Dn is discharged by a turning movement of the disk return lever 24, and is ejected to the source disk storage unit 20 of the turn table 12.

Thereafter, at the step E11, a turn control signal S1 is output from the system controller 10 to the turn table driver 55, and the turn table 12 having the optical disk Dn stored therein is turned (inverted) by 180 degrees. Then, at the step E12, the optical disk Dn is mounted by means of the loading driver 57 from the disk storage unit 20 at the front side of the turn table 12 to the disk drive unit 14. At this time, the first disk removing lever 23*a* disposed in a direction of the other one of the diagonal lines shown in FIG. 6 is operated so as to remove the optical disk Dn from the disk storage unit 20.

In this manner, the optical disk Dn is guided to the guide groove 22*a* of the carrying rail 22 while the top and bottom sides are reversed, and moves to the center of the main chassis 13. As in the above described case, after the optical disk Dn has reached the substantial center, the disk is lifted by means of the disk return lever 24, and is carried to the disk mount site of the disk drive unit 14 in the same way. As a result, the optical disk Dn can be remounted so that the face SIDE-A is oriented to an opposite side, i.e., toward the disk drive unit 14.

Then, the optical disk Dn removed from the disk storage unit 20 is mounted on the disk drive unit 14, and at the step E13, the face SIDE-B of the optical disk Dn is reproduced. Therefore, even in the case where an optical disk Dn of single sided recording system is mounted on the disk storage unit 20 in the opposite direction, the information recording face can be automatically checked and reproduced.

[4] During Request for Double Sided Continuous Reproduction

Figure 15A:
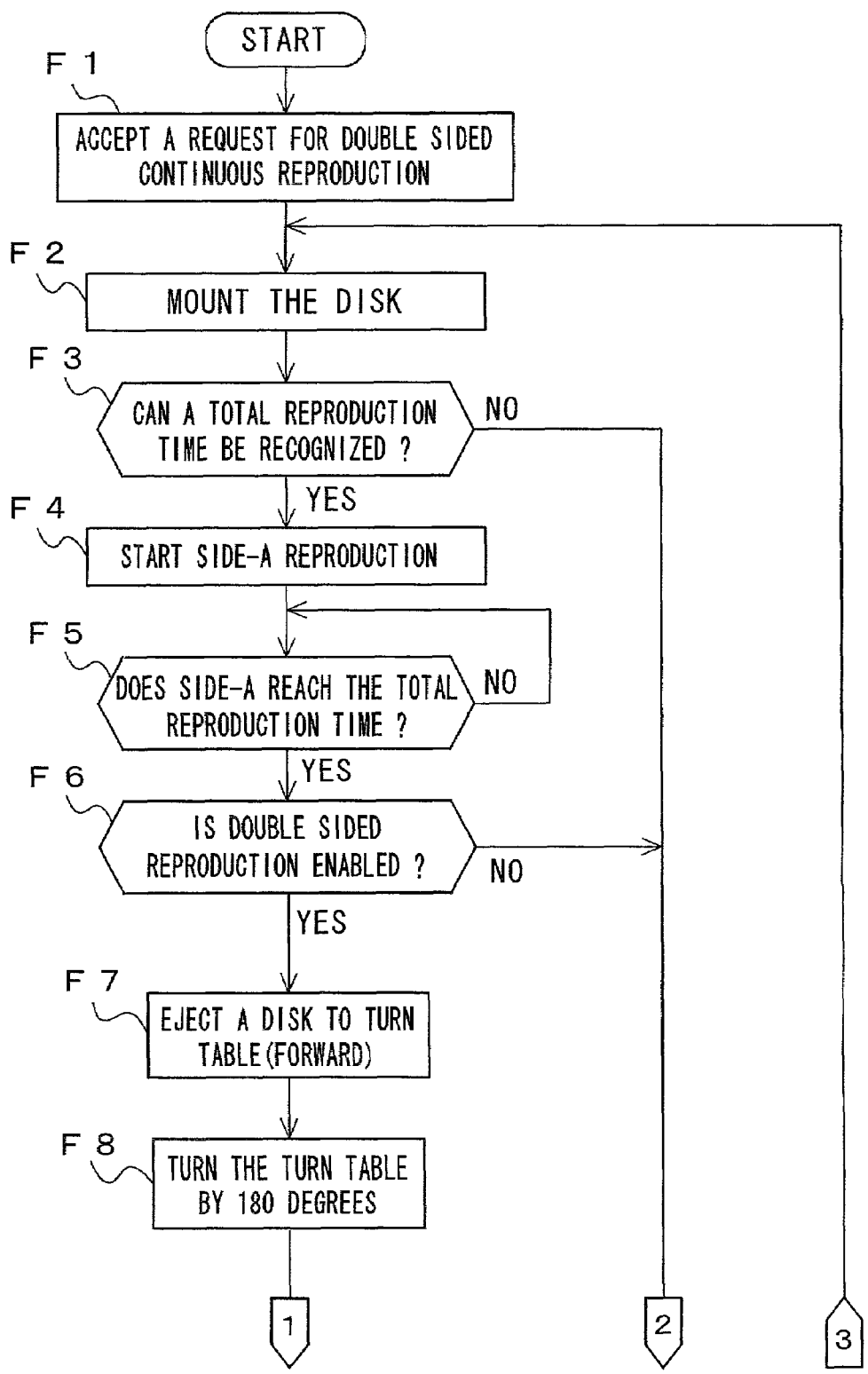
FIG. 15A and FIG. 15B are flow charts each showing a control example during a request for double sided continuous reproduction of the disk.
Figure 15B:
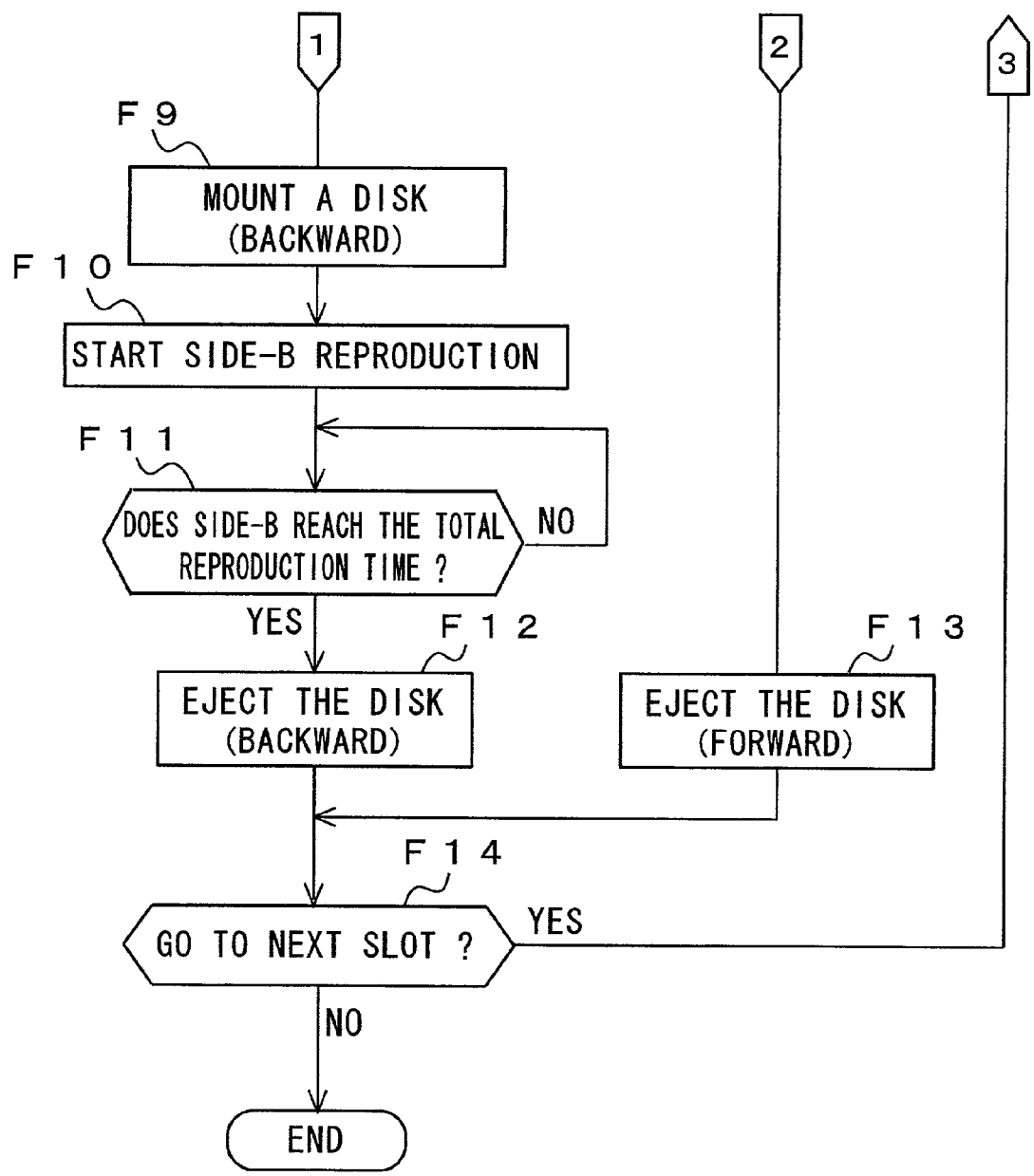

FIG. 15A and FIG. 15B are flow charts each showing a control example during a request for double sided continuous reproduction. This example presumes that reproduction sequence information is registered in advance to the memory 44 with respect to an optical disk Dn of double sided recording system and that the face SIDE-A is first reproduced, and then, the face SIDE-B is reproduced. Of course, an optical disk Dn removed from a disk storage unit 20 is mounted on a disk drive unit 14, and then, disk check is performed to detect reproduction sequence information such as total reproduction time, for example, so that it may be judged whether the disk face is an information recording face of a first reproduction sequence or an information recording face of a second reproduction sequence based on the detection.

With this being presumed, when the user operates an operating unit 82, thereby issuing a request for double sided continuous reproduction, such double sided continuous reproduction request is accepted by means of the system controller 10 at the step F1 of the flow chart shown in FIG. 15A. At the step F2, the system controller 10 mounts an optical disk Dn by means of the loading driver 57 from the disk storage unit 20 at the front side of the turn table 12 to the disk drive unit 14. At this time, the first disk removing lever 23a disposed in a direction of the other one of the diagonal lines shown in FIG. 6 is operated so as to remove the optical disk Dn from the disk storage unit 20.

In this manner, the optical disk Dn is guided to the guide groove 22a of the carrying rail 22, and moves to the center of the main chassis 13. As in the above described case, after the optical disk has reached the substantial center, the disk is lifted by means of the disk return lever 24, and is carried to the disk mount site of the disk drive unit 14 in the same manner.

Thereafter, processing goes to the step F3 at which it is checked whether a total reproduction time concerning an optical disk Dn in which a request for continuous reproduction has been made has been successfully verified. The total reproduction time is grasped by means of disk check. In the case where the total reproduction time has been successfully verified, namely, in the case where an information recording face of the face SIDE-A has been successfully checked, processing goes to the step F4 at which the face SIDE-A starts reproduction. Then, processing goes to the step F5 at which a total reproduction time of the faces SIDE-A and SIDE-B is recognized and monitored. For example, an elapse of time from a time when the face SIDE-A has started reproduction is measured, and the integrated elapsed time is compared with a total reproduction time of the face SIDE-A. In the case where the integrated elapsed time has reached the total reproduction time of side A, reproduction is terminated. Then, processing goes to the step F6 at which it is checked whether or not the optical disk Dn is of double sided recording system.

This example presumes that the optical disk Dn is of double sided recording system. Thus, processing goes to the step F7 at which the optical disk Dn is pulled out forwardly from the disk drive unit 14 by means of the loading driver 57. At this time, the optical disk Dn is released from the disk table 15, and is placed on the disk return lever 24. Then, the disk is returned onto the carrying rail 22 together with the disk return lever 24. In addition, the optical disk Dn is discharged by a turning movement of the disk return lever 24, and is ejected to the source disk storage unit 20 of the turn table 12.

Thereafter, a turn control signal S1 is output from the system controller 10 to the turn table driver 55, and at the step F8, the turn table 12 having the optical disk Dn stored therein is turned (inverted) clockwise by 180 degrees. Then, at the step F9 as shown in FIG. 15B, the optical disk Dn is mounted by means of the loading driver 57 from the disk storage unit 20 at the rear side of the turn table 12 to the disk drive unit 14. At this time, a second disk removing lever 23b disposed in a direction of the other one of the diagonal lines shown in FIG. 6 is operated so as to remove an optical disk Dn from the disk storage unit 20.

In this manner, the optical disk Dn is guided to a guide groove 22a of a carrying rail 22 while its top and bottom faces are reversed, and moves to the center of the main chassis 13. Then, as in the above described case, after the optical disk Dn has reached the substantial center, the disk is lifted by means of the disk return lever 24, and is carried to the disk mount site of the disk drive unit 14 in the same way. As a result, the optical disk Dn can be remounted so that the face SIDE-B is oriented to an opposite side, i.e., toward the disk drive unit 14.

Thereafter, at the step F10, the face SIDE-B is started to be reproduced. Then, processing goes to the step F11 at which a total reproduction time of the face SIDE-B is recognized and monitored. In this case as well, an elapsed time from a time when the face SIDE-B starts reproduction is measured, and this integrated elapsed time is compared with a total reproduction time of the face SIDE-B. In the case where the integrated elapsed time has reached the total reproduction time of side B, reproduction is terminated. Then, processing goes to the step F12 at which the optical disk Dn is pulled out backwardly from the disk drive unit 14 by means of the loading driver 57.

At this time, the optical disk Dn is released from the disk table 15, and is placed on the disk return lever 24. Then, the disk is returned onto the carrying rail 22 together with the disk return lever 24, and is discharged by a turning movement of the disk return lever 24 to be returned to the source disk storage unit 20.

In the case where the optical disk Dn does not reach its total reproduction time at the step F3 and in the case where the optical disk Dn is not of double sided recording system at the step F6, processing goes to the step F13 at which the optical disk Dn is pulled out forwardly from the disk drive unit 14 by means of the loading driver 57. At this time, the optical disk Dn is released from the disk table 15, and is placed on the disk return lever 24. Then, the disk is returned onto the carrying rail 22 together with the disk return lever 24. In addition, the optical disk Dn is discharged by a turning movement of the disk return lever 24, and is ejected to the source disk storage unit 20 of the turn table 12.

Thereafter, processing goes to the step F14 at which it is judged by the system controller 10 whether or not the disk is moved to a next disk storage unit (slot) 20. Upon this judgment, there is a case in which the user operates an operating unit 82, thereby stopping a request for double sided continuous reproduction or a case in which the optical disks Dn of the continuously adjacent disk storage units 20 are automatically mounted and reproduced. Assuming that there is no user stop instruction, processing goes to the step F2 at which an optical disk Dn of a next slot is mounted. Subsequently, the steps F3 to F12 are repeated. Therefore, with respect to a plurality of optical disks of double sided recording system, each of the faces SIDE-A can be first reproduced, and then, each of the faces SIDE-B can be continuously reproduced.

Of course, reproduction sequence information may be detected by performing a disk check so as to judge whether the disk face is an information recording face of a first reproduction sequence or an information recording face of a second reproduction sequence. In this way, even in the case the first information recording face of the optical disk Dn of double sided recording system is mounted to be oriented opposite to the disk drive unit, after the optical disk Dn has been ejected to the turn table, the turn table is inverted, and then, the first information recording face of the optical disk Dn is mounted toward the disk drive unit, whereby each of the faces SIDE-A can be first reproduced, and then, each of the faces SIDE-B can be continuously reproduced with respect to a plurality of optical disks Dn.

Therefore, the user can perform double sided automatic continuous reproduction without removing a disk from the changer 200.

[5] During Request for Disk Rearrangement

Figure 17:
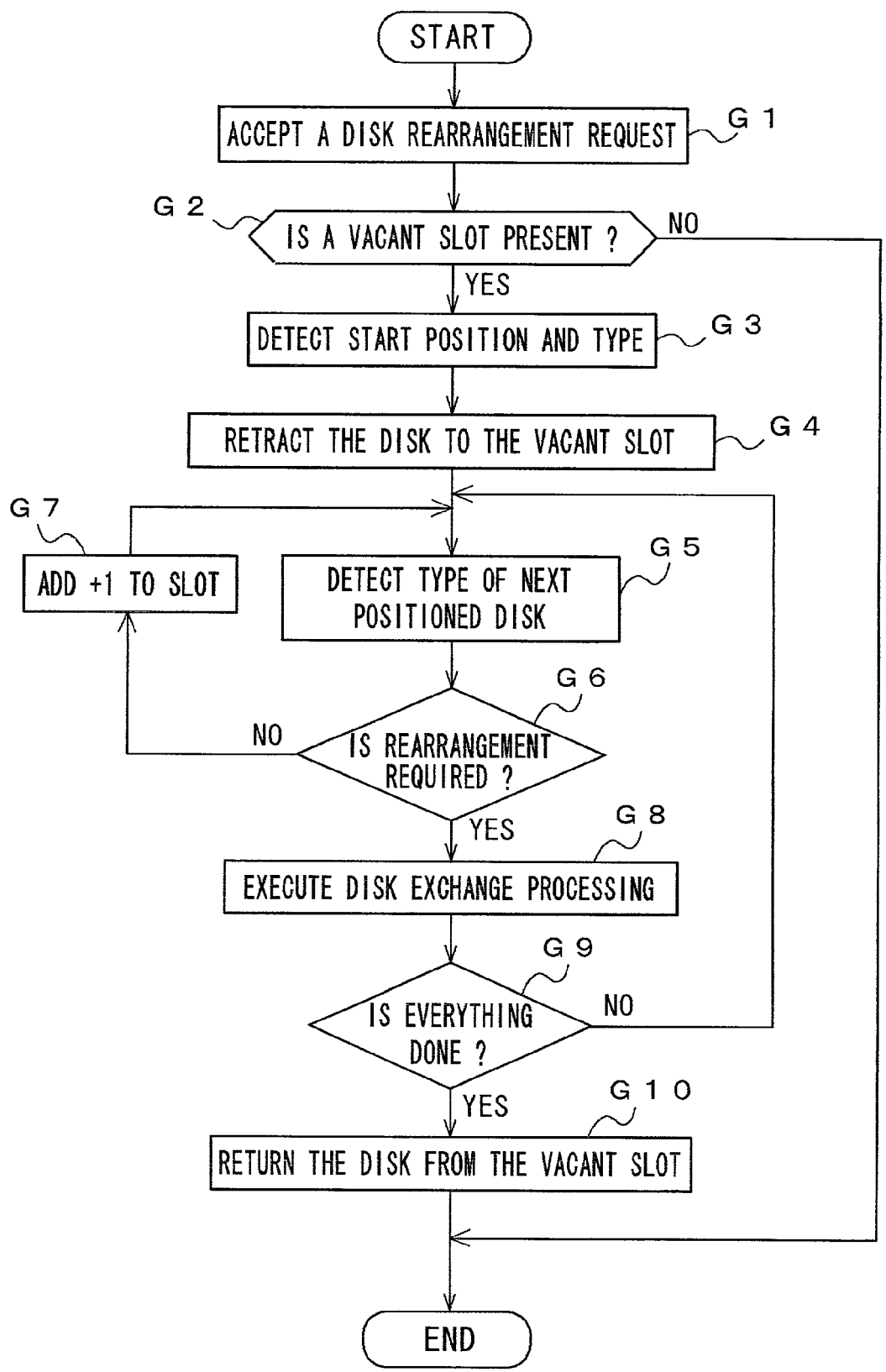
FIG. 17 is a flow chart showing an example of disk rearrangement in the DVD/CD changer 200.

FIG. 16A and FIG. 16B are imaginary views each showing an example when optical disks Dn are mounted during disk rearrangement and an arrangement example of these disks. FIG. 17 is a flow chart showing an example of disk rearrangement in the DVD/CD changer 200.

In this example, with respect to 10 optical disks Dn shown in FIG. 16A, five CD1 to CD5 marked with shaded circles and five DVD1 to DVD5 marked with open circles are mounted at random in disk storage units (hereinafter, referred to as slots #1 to #10), for example, in order of CD1, CD2, DVD1, CD3, DVD2, CD4, DVD3 to DVD5, CD5 or the like.

Then, as shown in FIG. 16B, it is presumed that five CD1 to CD5 are placed in slots #1 to #5, and five DVD1 to DVD5 are placed in slots #6 to #10. It is presumed that there exist one or more vacant slots #X marked with dashed circles in the turn table 12, and storage position information DIN is rewritten in the memory 44 every time the storage position of the optical disk Dn changes. First, assume that the optical disk Dn is retracted to a vacant slot #X.

With this being presumed, when the user operates an operating unit 82, thereby issuing a request for disk rearrangement so as to arrange CD and DVD in serial, for example, such disk rearrangement request is accepted by the system controller 10 at the step G1 of the flow chart shown in FIG. 17. The system controller 10 checks whether a vacant slot #X is present or absent at the step G2. The vacant slot #X is detected by a position detecting sensor 43a and an address detecting sensor 43b when a turn control signal S1 is output from the system controller 10 to the turn table driver 55, and a turn table 12 having an optical disk Dn stored therein is turned clockwise.

If a vacant slot #X is present in the turn table 12, the position detecting sensor 43a detects a position of the turn table 12, and the address detecting sensor 43b detects an address of the vacant slot #X. In this manner, these detecting sensors 43a and 43b output a position detecting signal S51 and an address detecting signal S52 to the system controller 10. The system controller 10 can judge whether a vacant slot #X is present or absent based on the position detecting signal S51 and the address detecting signal S52.

Therefore, in the case the vacant slot #X is present, processing goes to the step G3 at which the system controller 10 determines a start position at which the optical disks Dn are arranged, and detects type of optical disk Dn mounted at the start position. In an example shown in FIG. 16A, CD1 is mounted on slot #1. When this position is determined as a start position, processing goes to the step G4 at which CD1 is retracted to a vacant slot #X in accordance with <1> of an example shown in FIG. 16A in order to retract the optical disk Dn in slot #X.

During this retracting operation, CD1 is mounted by means of the loading driver 57 from slot #1 at the front side, for example, of the turn table 12 to the disk drive unit 14, a turn control signal S1 is output from the system controller 10 to the turn table driver 55, and the turn table 12 having CD1 removed therefrom is turned clockwise or counterclockwise by a predetermined number of slots. Then, CD1 is pulled out forwardly from the disk drive unit 14 to the vacant slot #X by means of the loading driver 57.

Then, processing goes to the step G5 at which type of the next positioned optical disk Dn is detected. In an example shown in FIG. 16A, an optical disk Dn is defined as CD2. Then, at the step G6, it is judged whether or not rearrangement is required. In the example shown in FIG. 16A, since there is no need for rearrangement, CD2 is left as is, and turn table 12 is turned so as to add +1 to the current slot. Then, processing reverts to the step G5 at which type of the next positioned optical disk Dn is detected. In the example shown in FIG. 16A, since an optical disk is defined as DVD1, it is judged whether or not rearrangement is required at the step G6. Since rearrangement is required, processing goes to the step G8 at which exchange processing or move processing of the optical disks Dn is executed.

In the example shown in FIG. 16A, CD4 and DVD1 are first exchanged with each other. Specifically, at <2>, CD4 is moved to slot #1. By this movement, slot #6 becomes vacant. Then, processing goes to the step G9 at which it is checked whether or not all of the remaining optical disks Dn other than saved disks have been rearranged. Otherwise, processing goes to the step G5 at which type of the next positioned disk Dn is detected. In the case where it is judged that rearrangement is required at the step G6, processing goes to the step G8 at which exchange processing of optical disks Dn is executed. In the example shown in FIG. 16A, at <3> DVD1 is moved to slot #6 which has been vacant. By this movement, slot #3 becomes vacant. At <4>, CD5 is moved to this vacant slot #3. By this movement, slot #10 becomes vacant. At <5>, DVD2 is moved to this vacant slot #10. By this movement, slot #5 becomes vacant.

In the case where all of the remaining optical disks Dn other than saved disks are rearranged at the step G9, processing goes to the step G10 at which an optical disk Dn saved in vacant slot #X is restored to a vacant slot from which the same type of optical disk Dn has been removed. In the example shown in FIG. 16A, at <6> CD1 is moved to vacant slot #5. Therefore, even in the case where a plurality of optical disks Dn have been mounted at random in the turn table 12, the user can rearrange these disks by type with high reproducibility without removing the optical disks Dn from the unit.

In the example shown in FIG. 16A, although CD1, CD2, DVD1, CD3, DVD2, CD4, DVD3 , to DVD5, and CD5 , or the like have been mounted at random in slots #1, to #10, as shown in FIG. 16B, five CD4, CDS2, CD5, CD3, and CD1, are placed in slots #1, to #5, and five DVD1, DVD3, DVD4, DVD5, and DVD2, are placed in the subsequent slots #6, to #10.

Moreover, with respect to a plurality of recording media Dn, even in the case where these media are not stored in disk storage units with their information recording faces being arranged in a predetermined orientation, basic operation of

[1] is performed, whereby the information recording faces of these optical disks Dn can be arranged in a predetermined orientation. In this manner, the disks can be rearranged by disk type or by the user desired group, and the user can mount the optical disks Dn in slots at random without worrying about disk type.

The present embodiment has described an example when the present invention is applied to a disk reproducing apparatus exclusively used for reproduction of an information signal SIN. However, the present invention is, of course, applicable to a disk recording apparatus exclusively used for recording of the information signal SIN, and is also applicable to a disk recording/reproducing apparatus capable of performing both of recording and reproducing operations. Further, although the foregoing embodiment has described that 300 optical disks can be stored in the turn table 12, of course, the number of optical disks may be 300 or less or may be 300 or more.

In addition, although the foregoing embodiment has described an example when CD and DVD are applied as a disk shaped recording medium Dn, various optical disks can be used without being limited thereto as long as a recording medium is capable of performing double sided recording or reproducing operation. Further, an optical disk such as CD or CD-ROM having an information signal SIN recorded at only its single side is applicable as well.

In the case of such single sided recording system, although a face on which no information signal SIN is recorded is not provided to reproduce an information signal SIN, this face is provided to reproduce the information signal SIN at any of the front and rear positions of the turn table 12. Thus, there is provided an advantage that an optical disk such as CD can be stored without considering disk orientation. Further, apart from such optical disk, the present invention is applicable to a disk shaped recording medium Dn of another recording system such as magnetic disk or magneto-optical disk. In this way, according to the present invention, various modifications can occur without departing the spirit of the invention.

As has been described above, a disk recording and/or reproducing apparatus according to the present invention comprises a control device that controls the turn table and disk carrying medium so as to detect whether or not the recording medium is stored in the disk storage unit, judge an information recording face of the recording medium removed from the disk storage unit, and mount the recording medium intact on the disk drive unit or invert the recording medium based on the judgment result, thereby remounting the medium on the disk drive.

With this configuration, for example, in the case of a disk shaped recording medium of single sided recording system in which an information recording face of this recording medium has been mounted to be oriented opposite to a disk drive unit from one side, the user inverts the turn table having the recording medium stored therein, and remount the medium from the other side without removing the recording medium from the unit, whereby the information recording face can be mounted toward the disk drive unit.

Moreover, with respect to a plurality of recording media, even in the case these media are mounted in the disk storage units with their information recording faces being oriented at random, the user inverts the turn table on which the disk storage units are positioned while the recording media are mounted in the disk drive unit, whereby the information recording faces of these recording media can be arranged in a predetermined orientation.

In this manner, the present invention greatly contribute to provision of a disk recording and/or reproducing apparatus in which a disk drive unit is disposed at only one side in the center hole at the center of the turn table.

A method of controlling a disk recording and/or reproducing apparatus according to the present invention is featured in that, in controlling a turn table for storing a disk shaped recording medium to be vertically placed or disk carrying means and the like, it is detected whether or not a recording medium is stored in a disk storage unit of the turn table, an information recording face of a recording medium removed from the disk storage unit is judged, and based on the judgment result, the recording medium is mounted intact on a disk drive unit or is inverted so as to be remounted on the disk drive unit.

With this configuration, even in the case where a recording medium is mounted to be oriented opposite to the disk drive unit, the user can mount the information recording face toward the disk drive unit without removing the recording medium from the unit. Moreover, with respect to a plurality of recording media, even in the case where these media are mounted in the disk storage unit with their information recording faces oriented at random, the information recording faces of these recording media can be arranged in a predetermined orientation.

The present invention is applicable very suitably to a hundred-CD changer comprising a function for controlling a turn table for storing a disk shaped recording medium to be vertically placed or disk carrying means, a DVD changer, or a DVD/CD changer and the like.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. A disk recording and/or reproducing apparatus comprising:
   a turn table on which a disk storage unit for storing a disk shaped recording medium to be vertically placed is arranged in plurality in a circumferential direction;
   a disk drive unit disposed in a center hole provided at the center of the turn table, the disk drive unit mounting the recording medium to record and/or reproduce an information signal;
   disk carrying means for carrying the recording medium between the disk drive unit and the turn table; and
   control device for controlling the input and output of the turn table, the disk drive unit, and the disk carrying means, wherein the control device controls the turn table and disk carrying means so as to judge whether or not the recording medium is stored in the disk storage unit, judge an information recording face of the recording medium removed from the disk storage unit, and mount the recording medium intact on the disk drive unit or invert the recording medium based on the judgment result, thereby remounting the medium on the disk drive unit.

2. A disk recording and/or reproducing apparatus as claimed in claim 1, wherein there are provided: operating means operated to specify a position of the disk storage unit for the control device in order to select the arbitrary recording medium; and detecting means for detecting whether or not the recording medium is stored with respect to the disk storage unit specified by the operating means.

3. A disk recording and/or reproducing apparatus as claimed in claim 2, wherein, in the case where the recording medium is instructed to be inverted by the operating means, there is provided a nonvolatile storage unit for storing storage position information indicative of a storage position of the recording medium in the turn table and judgment result information on the information recording face of the recording medium, and the control device judges necessity of inversion of the recording medium based on the storage position information and judgment result information read out from the storage unit.

4. A disk recording and/or reproducing apparatus as claimed in claim 1, wherein the control device rewrites the storage position information every time the storage position of the storage medium changes.

5. A disk recording and/or reproducing apparatus as claimed in claim 1, wherein there is provided display means for displaying a video image concerning an inverting operation of the recording medium in progress.

6. A disk recording and/or reproducing apparatus as claimed in claim 5, wherein the display means is provided so as to display a video image concerning a case in which there is no necessity of inverting the recording medium.

7. A disk recording and/or reproducing apparatus as claimed in claim 1, wherein the control device handles a disk shaped recording medium of single sided recording system.

8. A disk recording and/or reproducing apparatus as claimed in claim 7, wherein, in the case of handling the recording medium of the single sided recording system, the control device mounts the recording medium removed from the disk storage unit on a disk drive unit, detects an information signal recorded at a predetermined position of the recording medium, and judges whether or not the disk face is an information recording face based on detection of the information signal.

9. A disk recording and/or reproducing apparatus as claimed in claim 7, wherein, in the case where the information recording face of the recording medium of the single sided recording medium is mounted to be oriented opposite to the disk drive unit, the control device ejects the recording medium to a turn table, inverts the turn table, and then, mounts the information recording face of the recording medium toward the disk drive unit.

10. A disk recording and/or reproducing apparatus as claimed in claim 1, wherein the control device handles a disk shaped recording medium of double sided recording system.

11. A disk recording and/or reproducing apparatus as claimed in claim 10, wherein, in the case of handling the recording medium of the double sided recording medium, the control device mounts the recording medium removed from the disk storage unit on a disk drive unit, detects an information signal recorded at a predetermined position of the recording medium, judges whether or not the disk face is an information recording face based on detection of the information signal, and judges whether both disk faces are information recording faces, or only a single disk face is an information recording face, or both disk faces are non-information recording faces.

12. A disk recording and/or reproducing apparatus as claimed in claim 10, wherein, in the case where reproduction sequence information is registered in advance with respect to the recording medium of the double sided recording system, the control device mounts the recording medium removed from the disk storage unit on a disk drive unit, detects the reproduction sequence information from the information signal recorded at the predetermined position of the recording medium, and judges whether the disk face is an information recording face of a first reproduction sequence or an information recording face of a second reproduction sequence based on detection of the reproduction sequence information.

13. A disk recording and/or reproducing apparatus as claimed in claim 10, wherein, in the case where the first information recording face of the recording medium of the double sided recording system is mounted to be oriented opposite to a disk drive unit, the control device ejects the recording medium to a turn table, inverts the turn table, and then, mounts the first information recording face of the recording medium toward the disk drive unit.

14. A method of controlling a disk recording and/or reproducing apparatus that comprises: at least a turn table on which a disk storage unit for storing a plurality of disk shaped recording medium to be vertically placed are arranged in a circumferential direction; a disk drive unit disposed in a center hole provided at the center of the turn table, the disk drive unit mounting the recording medium to record and/or reproduce an information signal; and disk carrying means for carrying the recording medium between the disk drive unit and the turn table, the control method comprising the steps of:

detecting whether or not a recording medium is stored in the disk storage unit;

mounting the recording medium from the disk storage unit at which the presence of storage has been detected, and judging an information recording face of the recording medium;

controlling the turn table and disk carrying means so as to mount the recording medium intact on the disk drive unit based on the judgment result or invert the recording medium to remount the medium on the disk drive unit.

15. A method of controlling a disk recording and/or reproducing apparatus as claimed in claim 14, wherein, when a position of the disk storage unit is specified so as to select the arbitrary recording medium, it is detected whether or not the recording medium is stored with respect to the specified disk storage unit.

16. A method of controlling a disk recording and/or reproducing apparatus as claimed in claim 14, wherein storage position information indicative of the storage position of the recording medium in the turn table and judgment result information on the information recording face of the recording medium are stored.

17. A method of controlling a disk recording and/or reproducing apparatus as claimed in claim 14, wherein, in the case where the recording medium is instructed to be inverted, necessity of inverting the recording medium is judged based on the storage position information and judgment result information that have been stored in advance.

18. A method of controlling a disk recording and/or reproducing apparatus as claimed in claim 17, wherein the storage position information is rewritten every time the storage position of the recording medium changes.

19. A method of controlling a disk recording and/or reproducing apparatus as claimed in claim 14, wherein a video image concerning an inverting operation of the recording medium in progress is displayed.

20. A method of controlling a disk recording and/or reproducing apparatus as claimed in claim 14, wherein a video image concerning a case in which there is no necessity of inverting the recording medium is displayed.

21. A method of controlling a disk recording and/or reproducing apparatus as claimed in claim 14, wherein the disk shaped recording medium of single sided recording system is handled.

22. A method of controlling a disk recording and/or reproducing apparatus as claimed in claim 21, wherein, in the case of handling a recording medium of the single sided recording system, the recording medium is mounted on a disk drive unit after removed from the disk storage unit, an information signal recorded at a predetermined position of the recording medium is detected, and it is judged whether or not the disk face is an information recording face based on detection of the information signal.

23. A method of controlling a disk recording and/or reproducing apparatus as claimed in claim 21, wherein, in the case where an information recording face of a recording medium of the single sided recording system is mounted to be oriented opposite to a disk drive unit, the recording medium is ejected to a turn table, the turn table is inverted, and then, the information recording face of the recording medium is mounted toward the disk drive unit.

24. A method of controlling a disk recording and/or reproducing apparatus as claimed in claim 14, wherein the disk shaped recording medium of double sided recording system is handled.

25. A method of controlling a disk recording and/or reproducing apparatus as claimed in claim 24, wherein, in the case of handling a recording medium of the double sided recording system, the recording medium removed from the disk storage unit is mounted on a disk drive unit, an information signal recorded at a predetermined position of the recording medium is detected, it is judged whether or not the disk face is an information recording face based on detection of the information signal, and it is judged whether both disk faces are information recording faces, or only a single disk face is an information recording face, or both disk faces are non-information recording faces.

26. A method of controlling a disk recording and/or reproducing apparatus as claimed in claim 24, wherein, in the case where reproduction sequence information is registered in advance with respect to a recording medium of the double sided recording system, the recording medium removed from the disk storage unit is mounted on a disk drive unit, reproduction sequence information is detected from an information signal recorded at a predetermined position of the recording medium, and it is judged whether the disk face is an information recording face of a first reproduction sequence or an information recording face of a second reproduction sequence based on detection of the reproduction sequence information.

27. A method of controlling a disk recording and/or reproducing apparatus as claimed in claim 24, wherein, in the case where a first information recording face of a recording medium of the double sided recording system is mounted to be oriented opposite to a disk drive unit, the recording medium is ejected to a turn table, the turn table is inverted, and then, the first information recording face of the recording medium is mounted toward the disk drive unit.

* * * * *